(12) United States Patent  (10) Patent No.: US 9,227,691 B2
Noborio et al.  (45) Date of Patent: Jan. 5, 2016

(54) BICYCLE BRAKE CALIPER ASSEMBLY

(71) Applicant: SHIMANO INC., Sakai (JP)

(72) Inventors: Daisuke Noborio, Sakai (JP); Tsutomu Muraoka, Sakai (JP); Osamu Kariyama, Sakai (JP); Masahiro Nakakura, Sakai (JP)

(73) Assignee: SHIMANO INC., Osaka (JP)

( * ) Notice: Subject to any disclaimer, the term of this patent is extended or adjusted under 35 U.S.C. 154(b) by 189 days.

(21) Appl. No.: 13/931,027

(22) Filed: Jun. 28, 2013

(65) Prior Publication Data

US 2015/0001014 A1   Jan. 1, 2015

(51) Int. Cl.
*F16D 55/00* (2006.01)
*B62L 1/00* (2006.01)
*B62L 3/02* (2006.01)
*B62K 23/06* (2006.01)

(52) U.S. Cl.
CPC .............. *B62L 1/005* (2013.01); *B62K 23/06* (2013.01); *B62L 3/023* (2013.01)

(58) Field of Classification Search
CPC ........... B62L 1/005; B62L 3/023; B62L 1/00; F16D 65/0068; F16D 65/18; B62K 23/06

USPC ................ 188/73.31, 71.1, 71.7, 72.4, 24.12, 188/24.11, 24.19, 24.22, 218 XL, 344
See application file for complete search history.

(56) References Cited

U.S. PATENT DOCUMENTS

| 4,215,768 A * | 8/1980 | Seki .......................... 188/73.45 |
| 6,230,849 B1 * | 5/2001 | Lumpkin .................. 188/24.12 |
| 6,334,514 B1 * | 1/2002 | Kirimoto et al. ........... 188/73.41 |
| 6,431,327 B2 * | 8/2002 | Lumpkin .................. 188/24.12 |
| 8,479,897 B2 * | 7/2013 | Yamashita et al. ............ 188/344 |
| 2003/0010580 A1 * | 1/2003 | Nakamura ................. 188/73.31 |
| 2007/0278055 A1 * | 12/2007 | Chen .............................. 188/2 D |
| 2013/0048444 A1 * | 2/2013 | Hirotomi et al. ........... 188/73.31 |

* cited by examiner

*Primary Examiner* — Pamela Rodriguez
(74) *Attorney, Agent, or Firm* — Mori & Ward, LLP

(57) ABSTRACT

A bicycle brake caliper assembly comprises a brake caliper and a base member. The brake caliper is configured to apply a braking force on a brake disc rotor configured to be rotatable about a rotational axis. The base member is configured to be coupled to the brake caliper and to be attached to a bicycle frame such that relative position between the rotational axis of the brake disc rotor and the brake caliper is adjustable in a radial direction of the brake disc rotor.

9 Claims, 27 Drawing Sheets

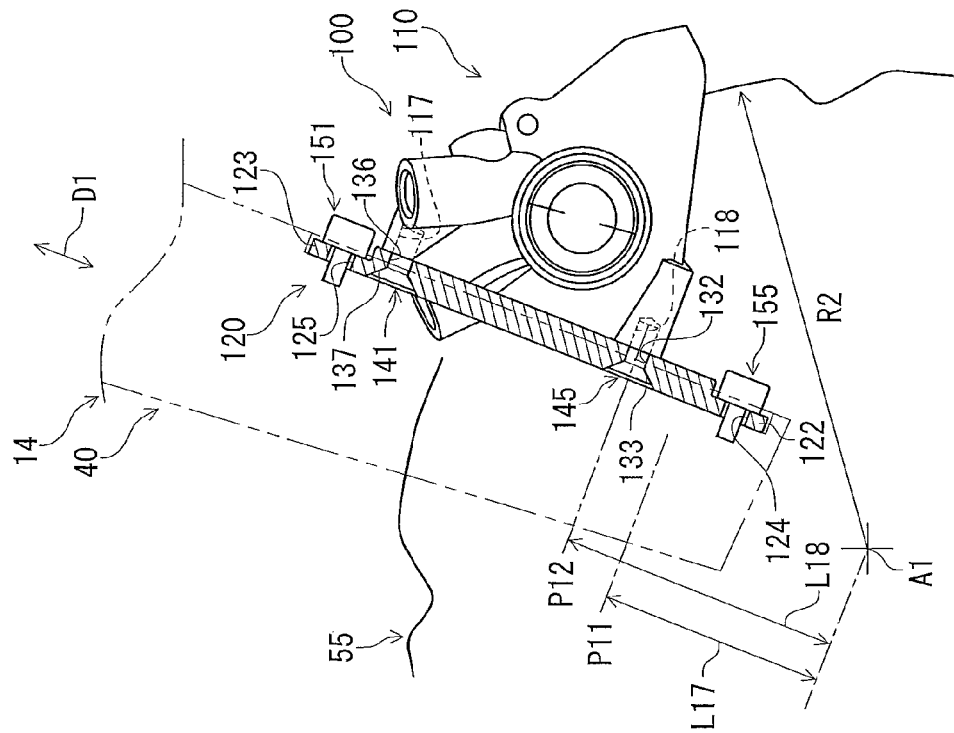
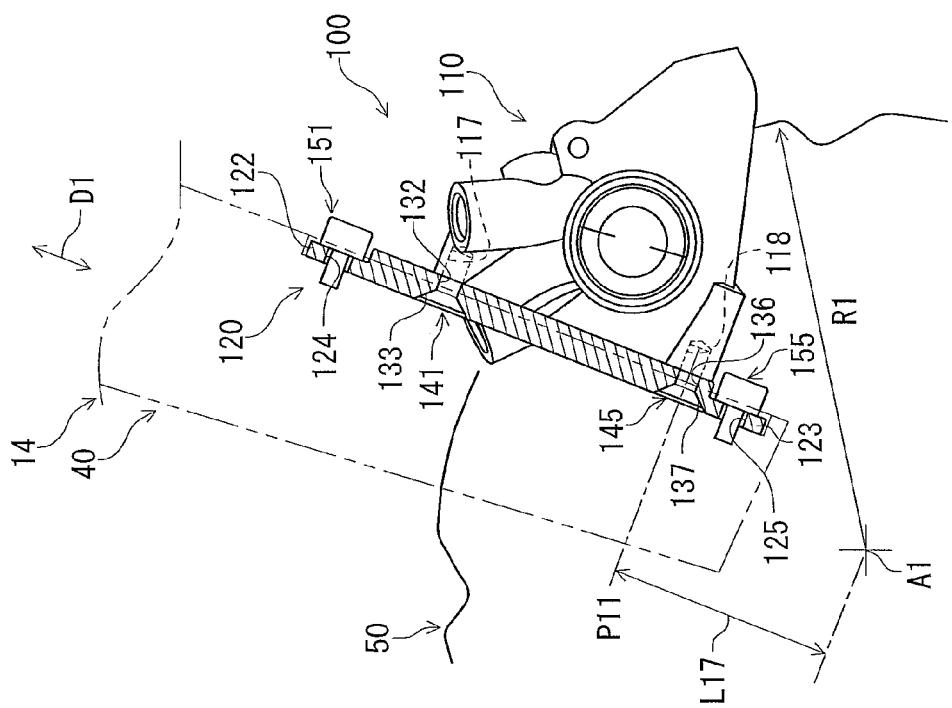

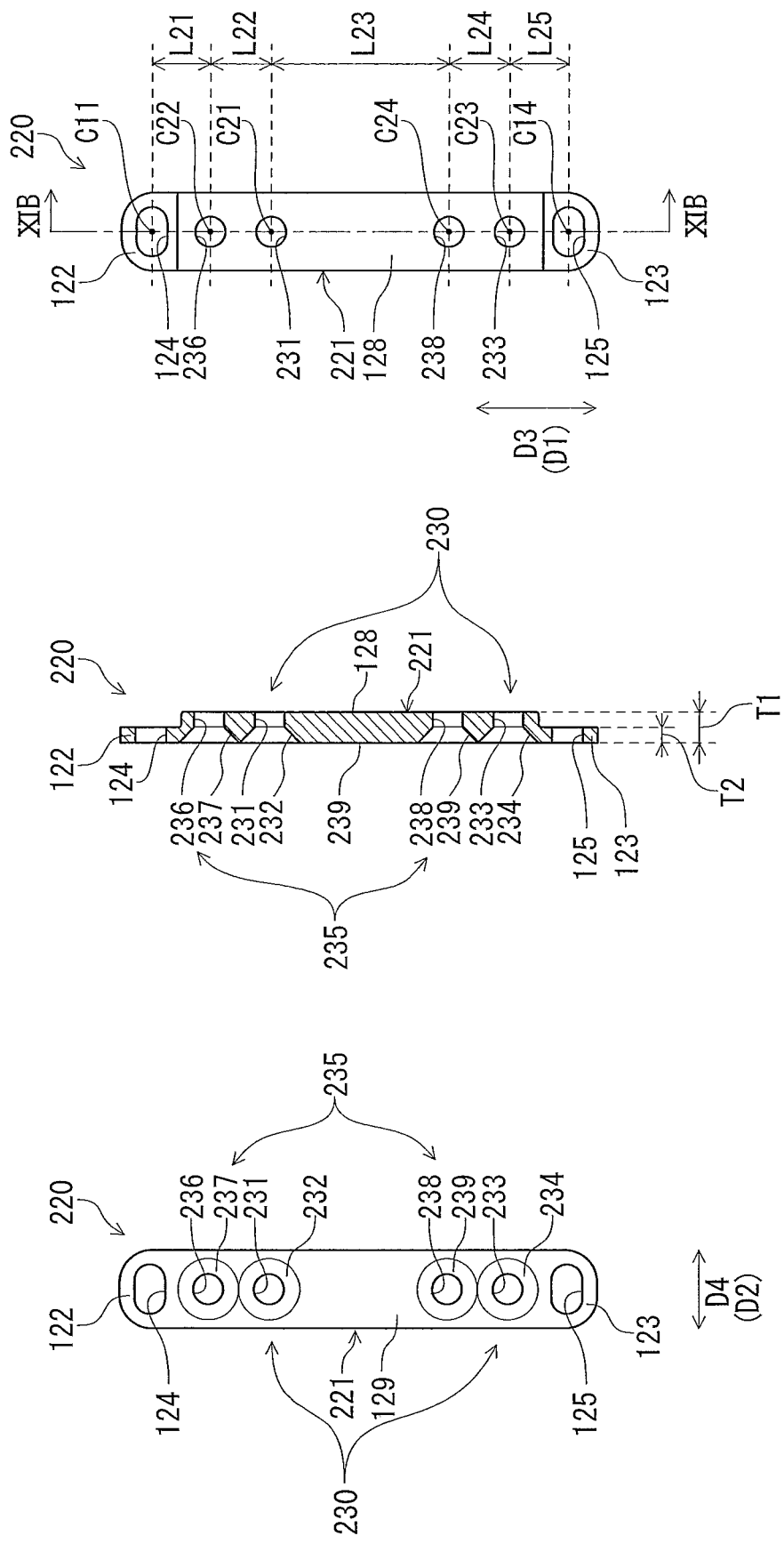

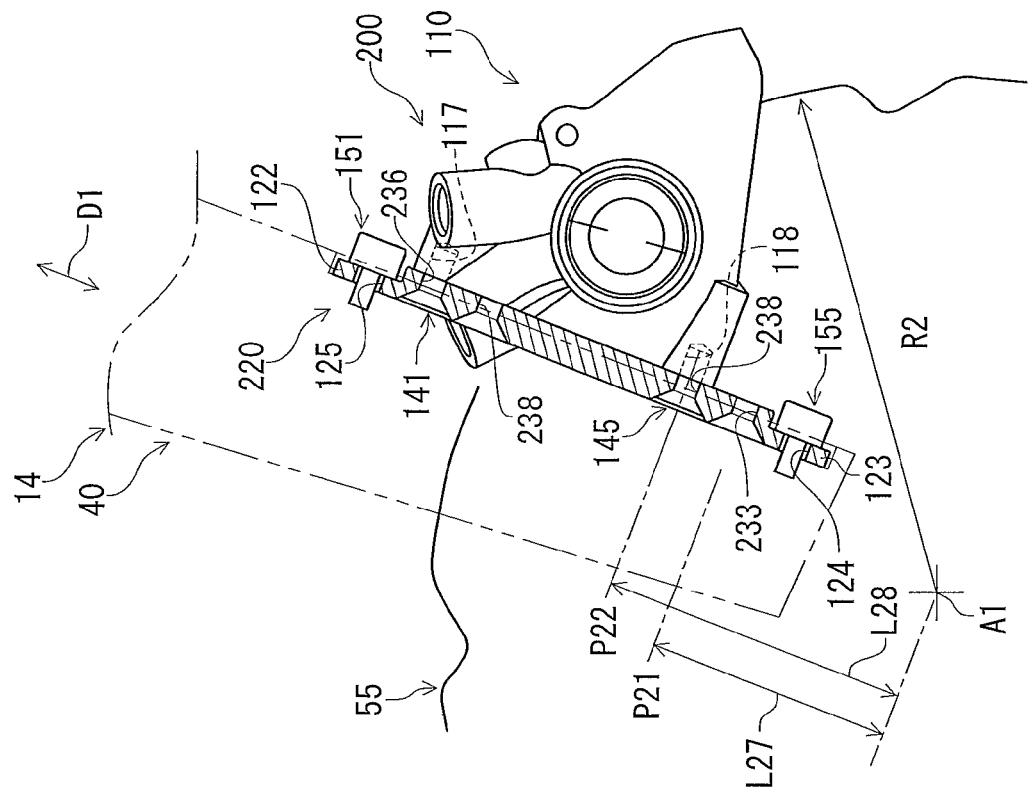
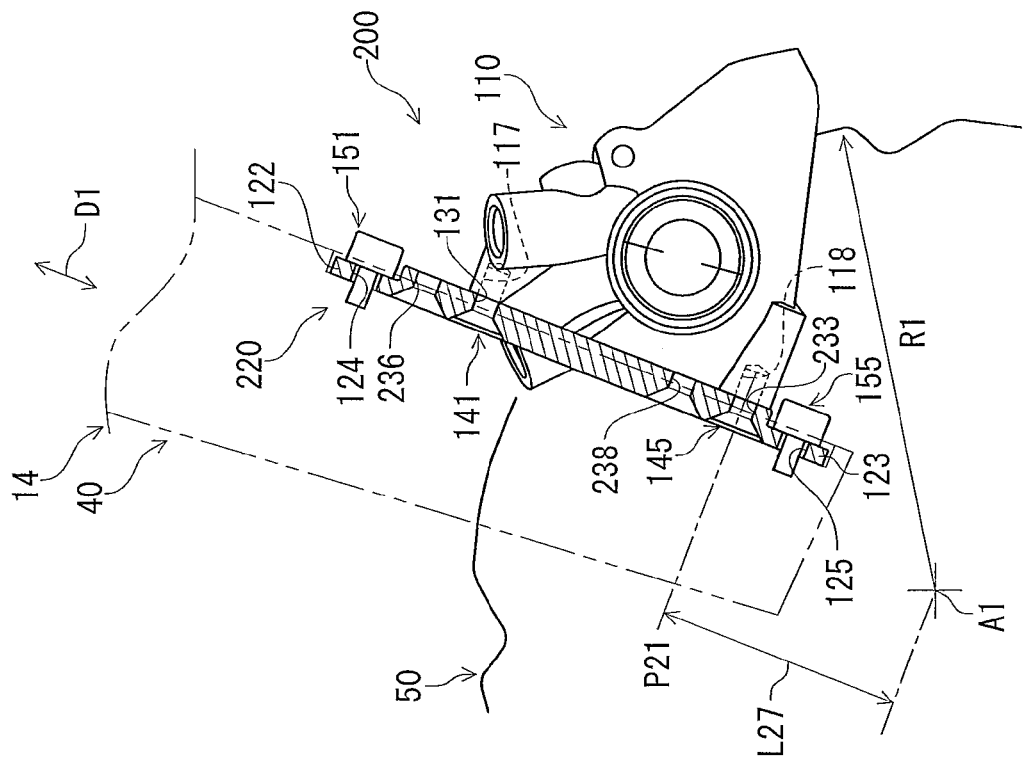

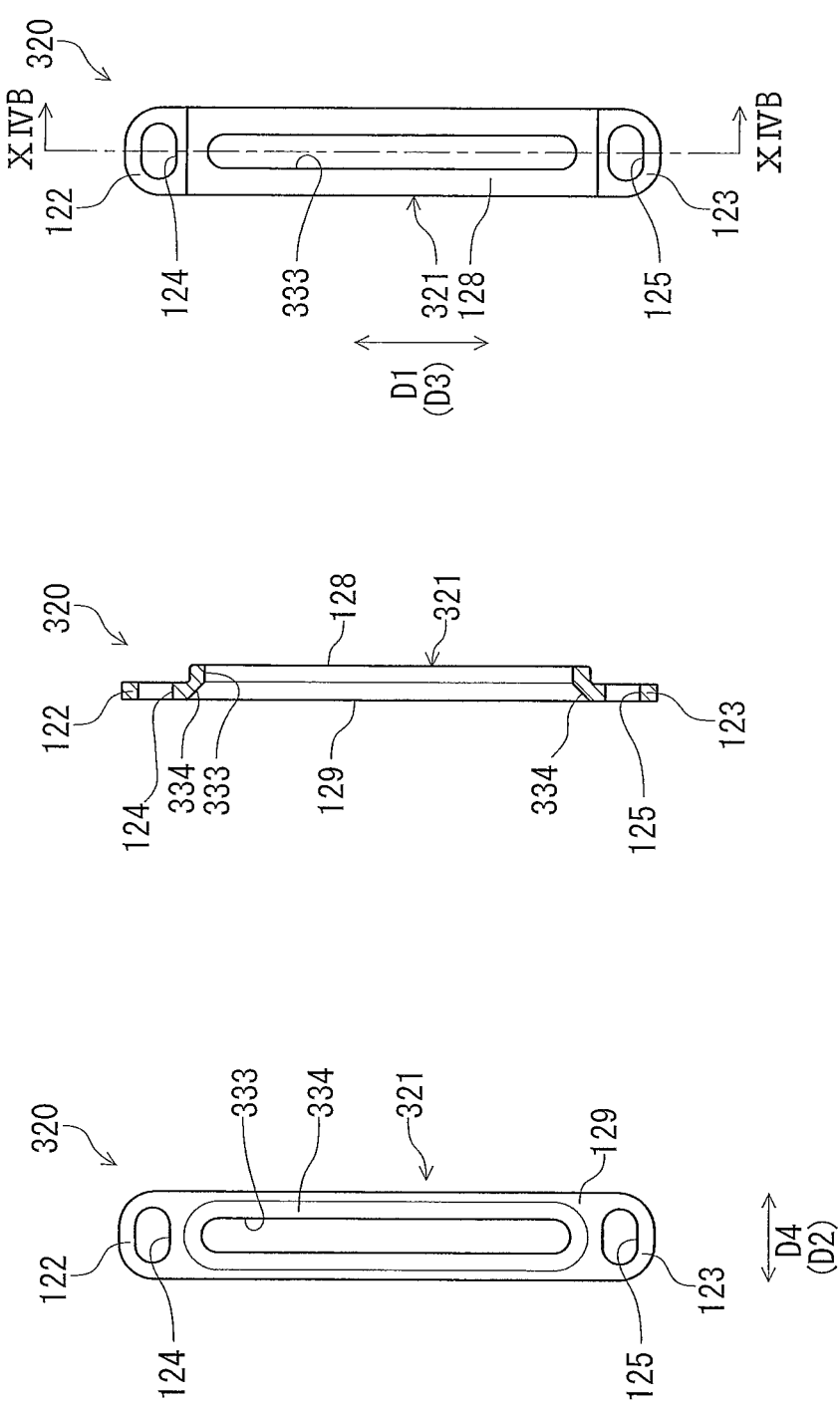

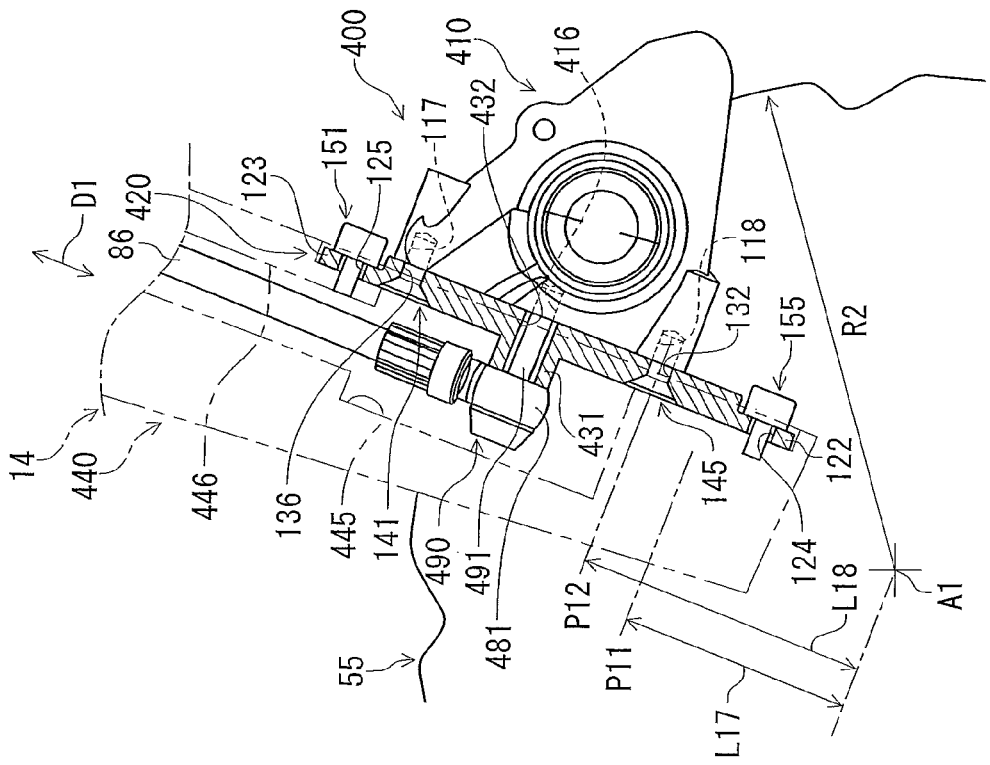
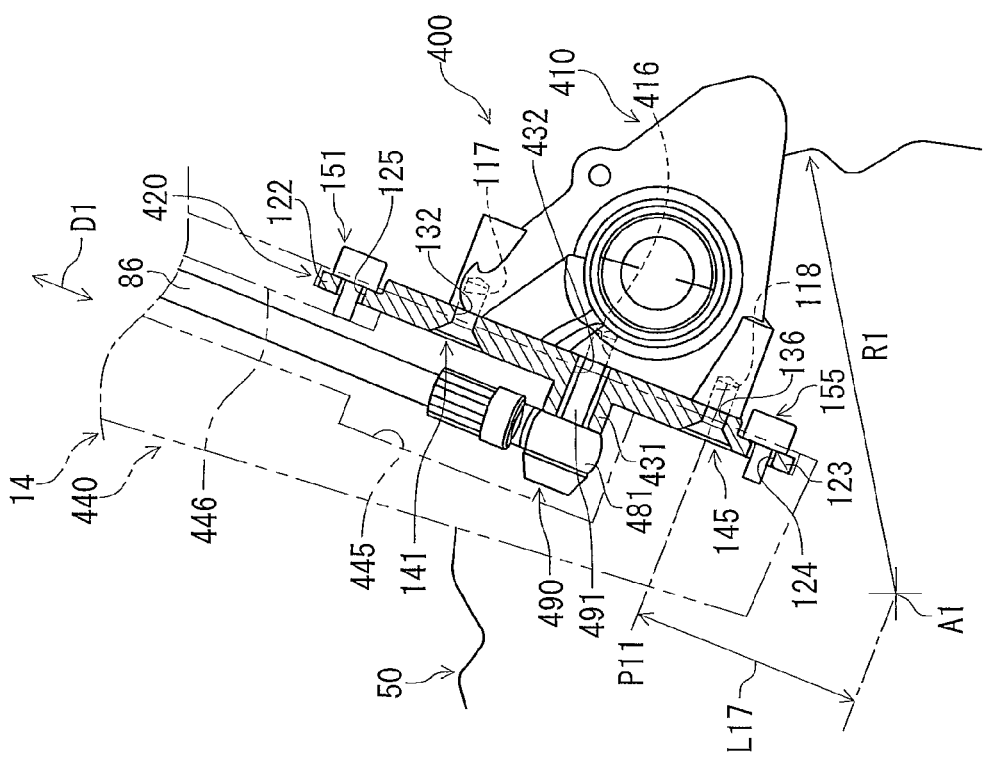

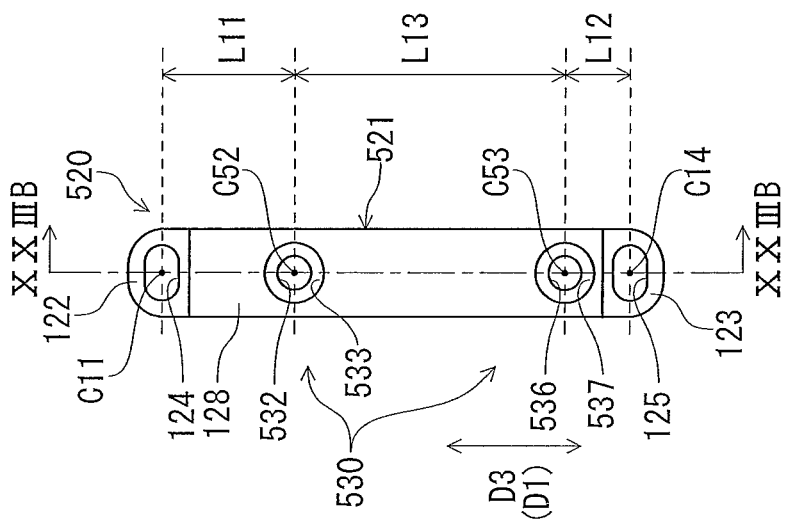
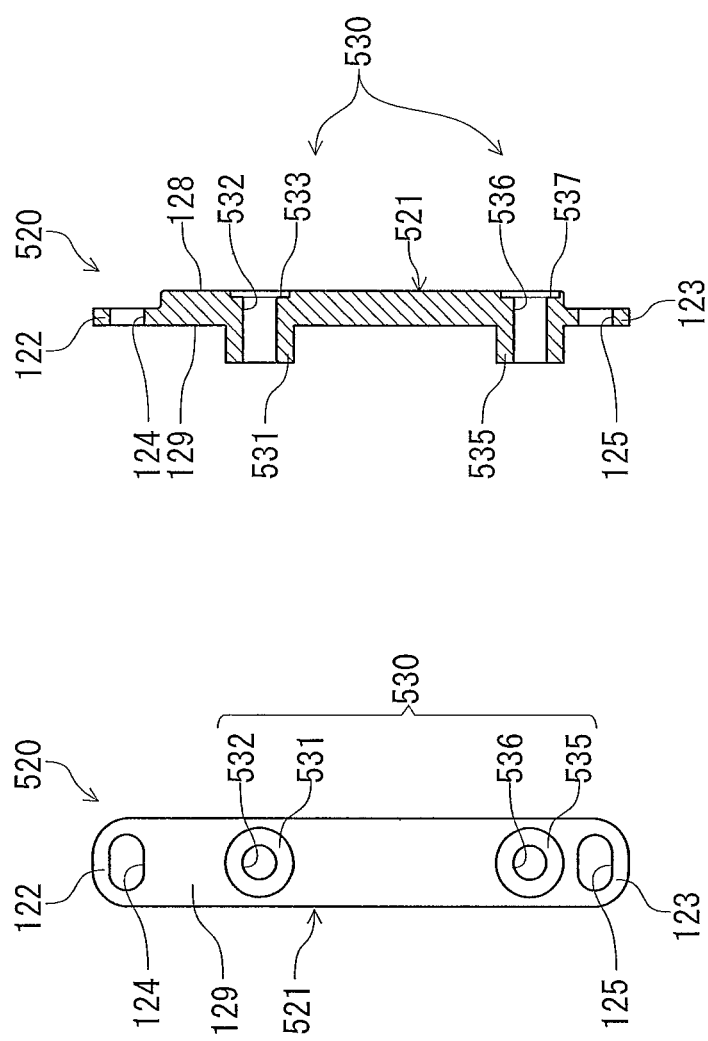
FIG. 23A  FIG. 23B  FIG. 23C

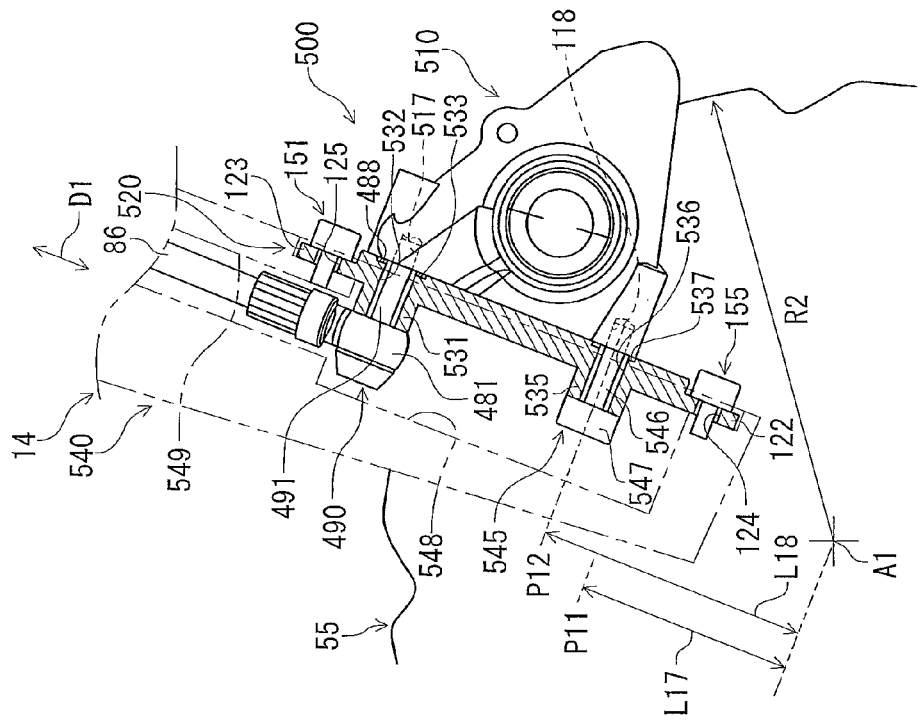
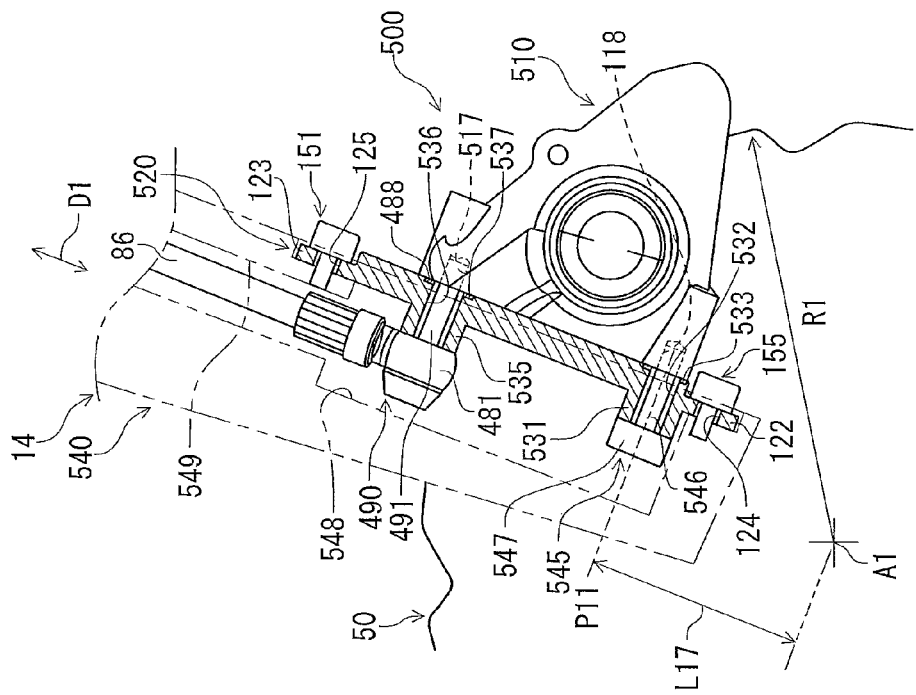

BICYCLE BRAKE CALIPER ASSEMBLY

BACKGROUND OF THE INVENTION

1. Field of the Invention

The present invention relates to a bicycle brake caliper assembly.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle brake device. In particular, in recent years, bicycles have been provided with disc braking devices.

SUMMARY OF THE INVENTION

In accordance with a first aspect of the present invention, a bicycle brake caliper assembly comprises a brake caliper and a base member. The brake caliper is configured to apply a braking force on a brake disc rotor configured to be rotatable about a rotational axis. The base member is configured to be coupled to the brake caliper and to be attached to a bicycle frame such that relative position between the rotational axis of the brake disc rotor and the brake caliper is adjustable in a radial direction of the brake disc rotor.

In accordance with a second aspect of the present invention, the bicycle brake caliper assembly according to the first aspect is configured so that the base member includes a coupling portion at which the brake caliper is coupled. The base member is attached to the bicycle frame with one of a first orientation and a second orientation. The base member is configured such that a first position of the coupling portion in a state where the base member is attached to the bicycle frame with the first orientation differs from a second position of the coupling portion in a state where the base member is attached to the bicycle frame with the second orientation, in the radial direction.

In accordance with a third aspect of the present invention, the bicycle brake caliper assembly according to the second aspect further comprises a first coupling member configured to couple the brake caliper to the base member. The coupling portion includes a first through-hole through which the first coupling member passes.

In accordance with a fourth aspect of the present invention, the bicycle brake caliper assembly according to the third aspect is configured so that the brake caliper includes a caliper fluid passage, and so that the first coupling member provides a fluid passage configured to communicate with the caliper fluid passage.

In accordance with a fifth aspect of the present invention, the bicycle brake caliper assembly according to the third aspect further comprises a second coupling member configured to couple the brake caliper to the base member. The coupling portion includes a second through-hole through which the second coupling member passes and which is arranged apart from the first through-hole in the radial direction.

In accordance with a sixth aspect of the present invention, the bicycle brake caliper assembly according to the fifth aspect is configured so that the brake caliper includes a caliper fluid passage. The base member includes an additional through-hole thorough which a fluid communicating member fluidly communicating with the caliper fluid passage passes. The additional through-hole is arranged at a middle position between the first through-hole and the second through-hole.

In accordance with a seventh aspect of the present invention, the bicycle brake caliper assembly according to the fifth aspect is configured so that the base member comprises a first attaching through-hole through which a first attaching member passes to attach the base member to the bicycle frame, and a second attaching through-hole through which a second attaching member passes to attach the base member to the bicycle frame. The second attaching through-hole is spaced apart from the first attaching through-hole in the radial direction and the first through-hole and the second through-hole are arranged between the first attaching through-hole and the second attaching through-hole.

In accordance with an eighth aspect of the present invention, the bicycle brake caliper assembly according to the seventh aspect is configured so that a distance between a center of the first attaching through-hole and a center of the first through-hole is greater than a distance between a center of the second attaching through-hole and a center of the second through-hole.

In accordance with a ninth aspect of the present invention, the bicycle brake caliper assembly according to the eighth aspect is configured so that the brake caliper includes a first threaded hole and a second threaded hole. The first coupling member includes a first external thread. The second coupling member includes a second external thread. The first external thread is screwed in the first threaded hole through the first through-hole and the second external thread is screwed in the second threaded hole through the second through-hole in a state where the base member is attached to the bicycle frame with the first orientation. The first external thread is screwed in the first threaded hole through the second through-hole and the second external thread is screwed in the second threaded hole through the first through-hole in a state where the base member is attached to the bicycle frame with the second orientation.

In accordance with a tenth aspect of the present invention, the bicycle brake caliper assembly according to the seventh aspect is configured so that the first attaching through-hole and the second attaching through-hole extend in an axial direction of the brake disc rotor in a state where the base member is attached to the bicycle frame.

In accordance with an eleventh aspect of the present invention, the bicycle brake caliper assembly according to the first aspect is configured so that the base member includes a first coupling portion at which the brake caliper is coupled, and a second coupling portion at which the brake caliper is coupled and which is arranged apart from the first coupling portion in the radial direction.

In accordance with a twelfth aspect of the present invention, the bicycle brake caliper assembly according to the eleventh aspect further comprises a first coupling member configured to couple the brake caliper to the base member. The first coupling portion includes a first through-hole through which the first coupling member passes. The second coupling portion includes a second through-hole through which the first coupling member passes.

In accordance with a thirteenth aspect of the present invention, the bicycle brake caliper assembly according to the twelfth aspect further comprises a second coupling member configured to couple the brake caliper to the base member. The first coupling portion includes a third through-hole through which the second coupling member passes. The second coupling portion includes a fourth through-hole through which the second coupling member passes.

In accordance with a fourteenth aspect of the present invention, the bicycle brake caliper assembly according to the thirteenth aspect is configured so that the first through-hole is provided between the second through-hole and the fourth through-hole in the radial direction, and so that the fourth through-hole is provided between the first through-hole and the third through-hole in the radial direction.

In accordance with a fifteenth aspect of the present invention, the bicycle brake caliper assembly according to the first aspect further comprises a first coupling member configured to couple the brake caliper to the base member. The base member includes an elongated through-hole through which the first coupling member passes, the elongated through-hole extending in the radial direction.

In accordance with a sixteenth aspect of the present invention, the bicycle brake caliper assembly according to the fifteenth aspect further comprises a second coupling member configured to passes through the elongated through-hole to couple the brake caliper to the base member.

In accordance with a seventeenth aspect of the present invention, the bicycle brake caliper assembly according to the first aspect is configured so that the brake caliper and the base member are formed as a one piece unitary member.

In accordance with a eighteenth aspect of the present invention, the bicycle brake caliper assembly according to the seventeenth aspect is configured so that the base member includes a first attaching through-hole through which a first attaching member passes to attach the base member to the bicycle frame at a first position, and a second attaching through-hole through which a second attaching member passes to attach the base member to the bicycle frame at the first position.

In accordance with a nineteenth aspect of the present invention, the bicycle brake caliper assembly according to the eighteenth aspect is configured so that the base member includes a third attaching through-hole through which the first attaching member passes to attach the base member to the bicycle frame at a second position which is different from the first position in the radial direction, and a fourth attaching through-hole through which the second attaching member passes to attach the base member to the bicycle frame at the second position.

In accordance with a twentieth aspect of the present invention, the bicycle brake caliper assembly according to the seventeenth aspect is configured so that the base member includes a first attaching through-hole through which a first attaching member passes to attach the base member to the bicycle frame, the first attaching through-hole extends in the radial direction, and a second first attaching through-hole through which a second attaching member passes to attach the base member to the bicycle frame, the second attaching through-hole extends in the radial direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8A is an elevational view of the bicycle brake caliper assembly illustrated in FIG. 4 (first position);

FIG. 8B is an elevational view of the bicycle brake caliper assembly illustrated in FIG. 7 (second position);

FIG. 11A is a back view of a base member illustrated in FIG. 10;

FIG. 11B is a partial cross sectional view of the base member taken along line XIB-XIB of FIG. 11C;

FIG. 11C is a front view of the base member illustrated in FIG. 10;

FIG. 12A is an elevational view of the bicycle brake caliper assembly illustrated in FIG. 9 (first position);

FIG. 12B is an elevational view of the bicycle brake caliper assembly illustrated in FIG. 10 (second position);

FIG. 14A is a back view of a base member illustrated in FIG. 13;

FIG. 14B is a partial cross sectional view of the base member taken along line XIVB-XIVB of FIG. 14C;

FIG. 14C is a front view of the base member illustrated in FIG. 13;

FIG. 20A is an elevational view of the bicycle brake caliper assembly illustrated in FIG. 16 (first position);

FIG. 20B is an elevational view of the bicycle brake caliper assembly illustrated in FIG. 16 (second position);

FIG. 23A is a back view of a base member illustrated in FIG. 21;

FIG. 23B is a partial cross sectional view of the base member taken along line XXIIIB-XXIIIB of FIG. 23C;

FIG. 23C is a front view of the base member illustrated in FIG. 21;

FIG. 25A is an elevational view of the bicycle brake caliper assembly illustrated in FIG. 21 (first position);

FIG. 25B is an elevational view of the bicycle brake caliper assembly illustrated in FIG. 21 (second position);

DESCRIPTION OF THE EMBODIMENTS

Figure 1:
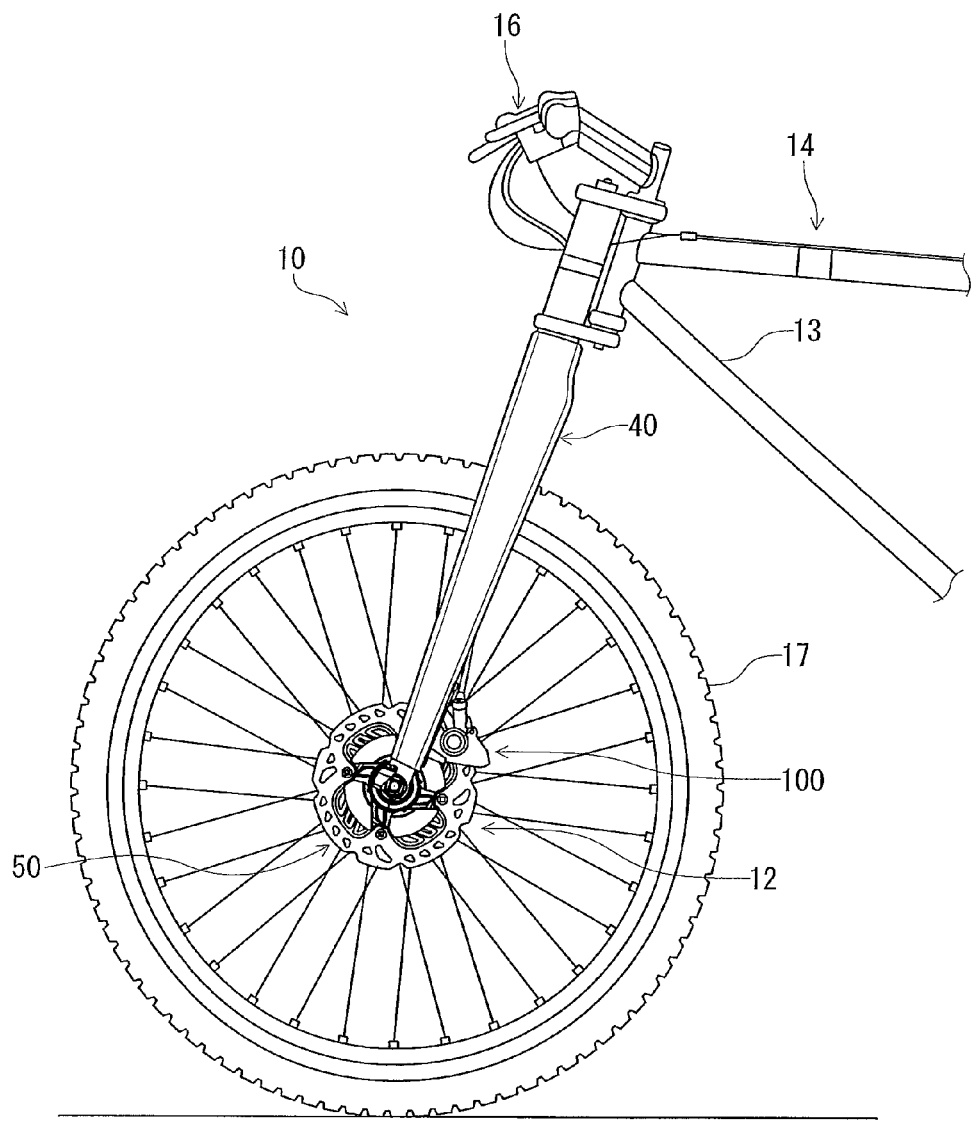
FIG. 1 is a left side elevational view of a front portion of a bicycle with a bicycle brake caliper assembly in accordance with a first embodiment of the present invention.

The embodiments will now be described with reference to the accompanying drawings, wherein like reference numerals designate corresponding or identical elements throughout the various drawings.

First Embodiment

Referring initially to FIG. 1, a bicycle 10 includes a bicycle frame 14, a front wheel 17, a rear wheel (not shown), a drive train (not shown), and a bicycle disc brake device 12. The bicycle frame 14 includes a main frame 13 and a front fork 40. The front wheel 17 is rotatably supported by the front fork 40. A handlebar 15 is attached to a front fork column by a stem. The rear wheel is rotatably supported by a rear end of the main frame 13. The bicycle disc brake device 12 includes a bicycle brake caliper assembly 100, a brake disc rotor 50, and a brake operating mechanism 16. In the first embodiment, the following directional terms "front", "rear", "forward", "rearward", "left", "right", "upward" and "downward" as well as any other similar directional terms refer to those directions which are determined on the basis of the rider who sits on a saddle (not shown) of a bicycle with facing the handlebar 15. Accordingly, these terms, as utilized to describe the bicycle brake caliper assembly 100 should be interpreted relative to a bicycle equipped with the bicycle brake caliper assembly 100 as used in an upright riding position on a horizontal surface. These definitions can be applied to other embodiments.

Figure 2:
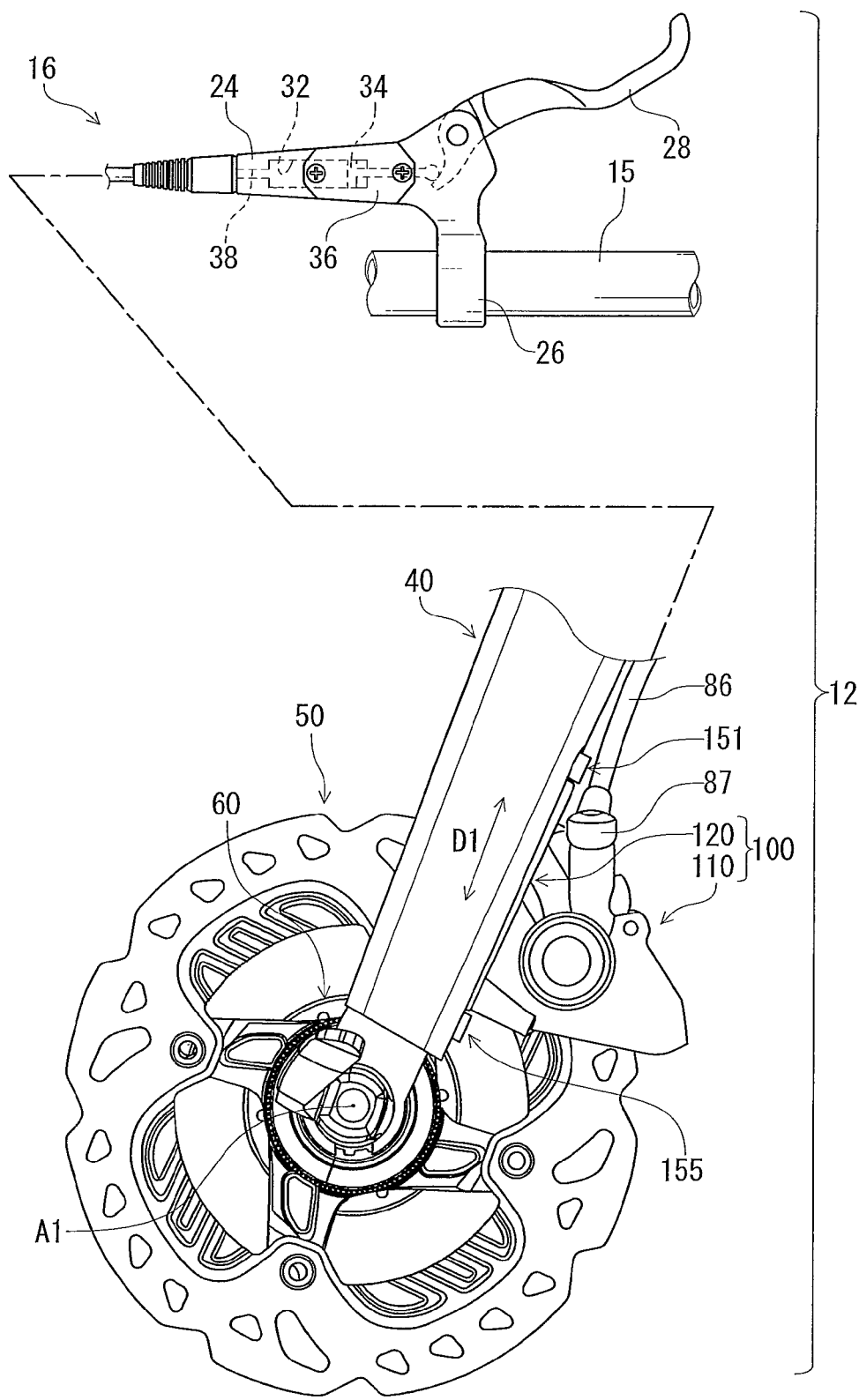
FIG. 2 is a partial side elevational view of a bicycle disc brake device with the bicycle brake caliper assembly in accordance with the first embodiment of the present invention.

Referring to FIG. 2, the bicycle brake caliper assembly 100 is mounted to the front fork 40 of the bicycle frame 14. It should be understood that the bicycle brake caliper assembly 100 can be mounted to the main frame 13 for the rear wheel. The bicycle brake caliper assembly 100 comprises a brake caliper 110 and a base member 120. The brake caliper 110 is coupled to the base member 120. The base member 120 is attached to the front fork 40 by a first attaching member 151 and a second attaching member 155. The brake operating mechanism 16 is designed to actuate the bicycle brake caliper assembly 100 to apply a braking force on a brake disc rotor 50. The brake disc rotor 50 is mounted on a front hub shell 60 to be integrally rotatable with the front hub shell 60 and the front wheel 17 about a rotational axis A1. Brake disc rotors having different outer diameters can be mounted on the front hub shell 60. The bicycle brake caliper assembly 100 is so configured that relative position between the rotational axis A1 and the brake caliper 110 is adjustable in a radial direction D1 of the brake disc rotor 50.

As seen FIG. 2, the brake operating mechanism 16 includes a master cylinder 24, a master piston 34, a clamp 26, a brake lever 28, and a hydraulic fluid reservoir 36. The brake operating mechanism 16 is mounted on the handlebar 15 via the clamp 26. The master cylinder 24 includes a master cylinder bore 32 in which the master piston 34 is movably disposed. The brake lever 28 is pivotally coupled to the master cylinder 24 for operating the bicycle brake caliper assembly 100. The brake lever 28 is operatively coupled to the master piston 34 such that the master piston 34 is movable in the master cylinder bore 32 in response to the pivotal movement of the brake lever 28. The hydraulic fluid reservoir 36 is in fluid communication with the master cylinder bore 32. The master cylinder 24 and the hydraulic fluid reservoir 36 contain hydraulic fluid such as mineral oil. The master cylinder 24 has an outlet port 38 for supplying hydraulic fluid to the bicycle brake caliper assembly 100 via a hydraulic brake hose 86 and a banjo 87.

Figure 3:
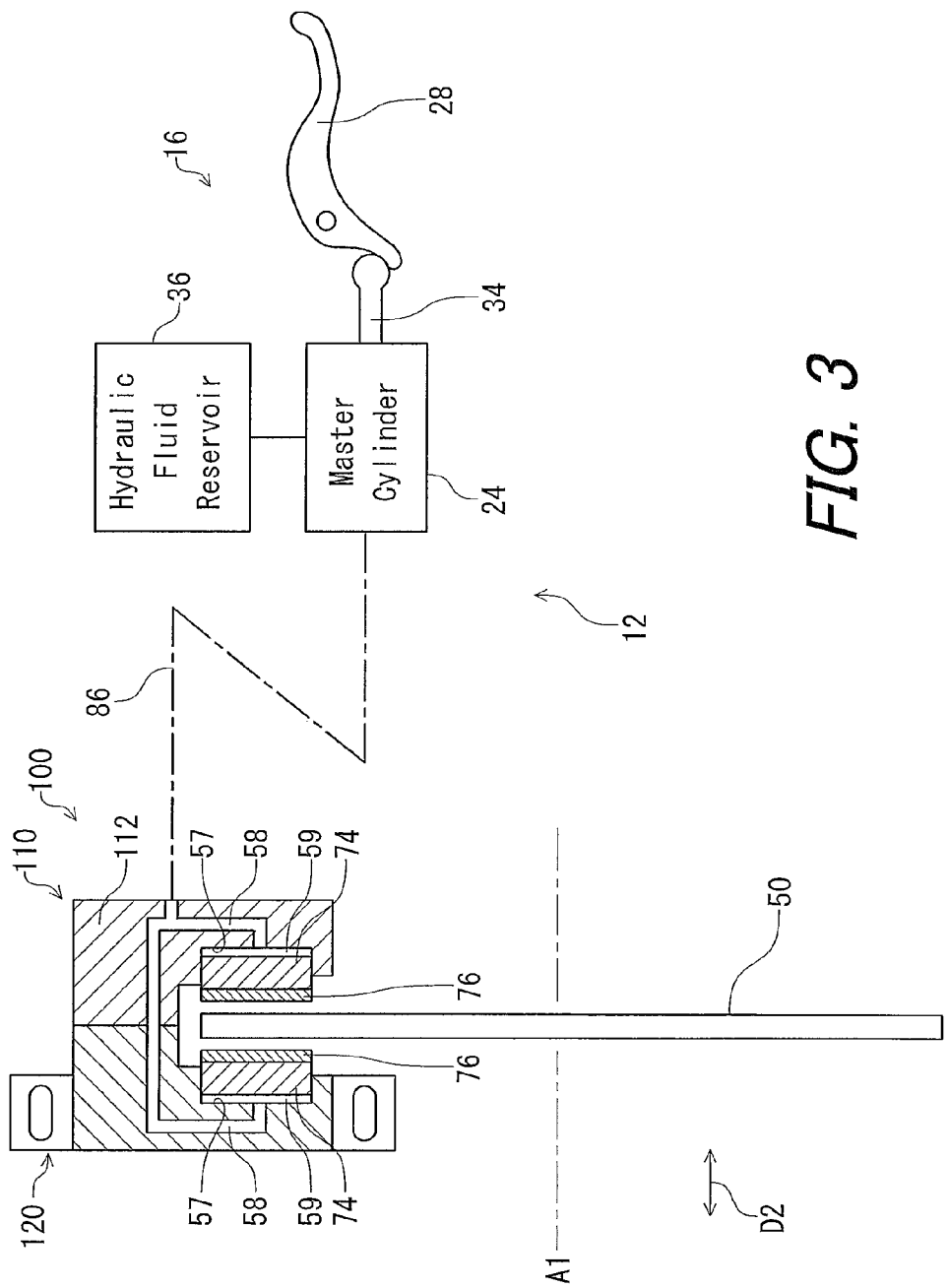
FIG. 3 is a schematic structural diagram of the bicycle disc brake device illustrated in FIG. 2.

Referring to FIG. 3, the brake caliper 110 is configured to apply a braking force on the brake disc rotor 50 configured to be rotatable about the rotational axis A1. The brake caliper 110 includes a housing 112, a pair of pistons 74, and a pair of brake pads 76. The brake pads 76 are coupled to a biasing member (not shown). The pistons 74 are arranged to press the brake pads 76 toward the brake disc rotor 50. The housing 112 includes a pair of cylinders 57, and a caliper fluid passage 58. The pistons 74 are disposed within the cylinders 57 to be movable in an axial direction D2 of the brake disc rotor 50. The fluid chambers 59 are defined by the pistons 74 and the cylinders 57. The fluid chambers 59 are in fluid communication with the caliper fluid passage 58. The caliper fluid passage 58 is in fluid communication with the master cylinder 24 via the hydraulic brake hose 86.

When the brake lever 28 is operated, the master piston 34 moves within the master cylinder 24 in response to the pivotal movement of the brake lever 28, which allows pressure fluid to move through the hydraulic brake hose 86 connected to the brake caliper 110. The pressure oil moves the pistons 74 to press the brake pads 76 against the brake disc rotor 50, applying the braking force to the brake disc rotor 50.

Figure 4:
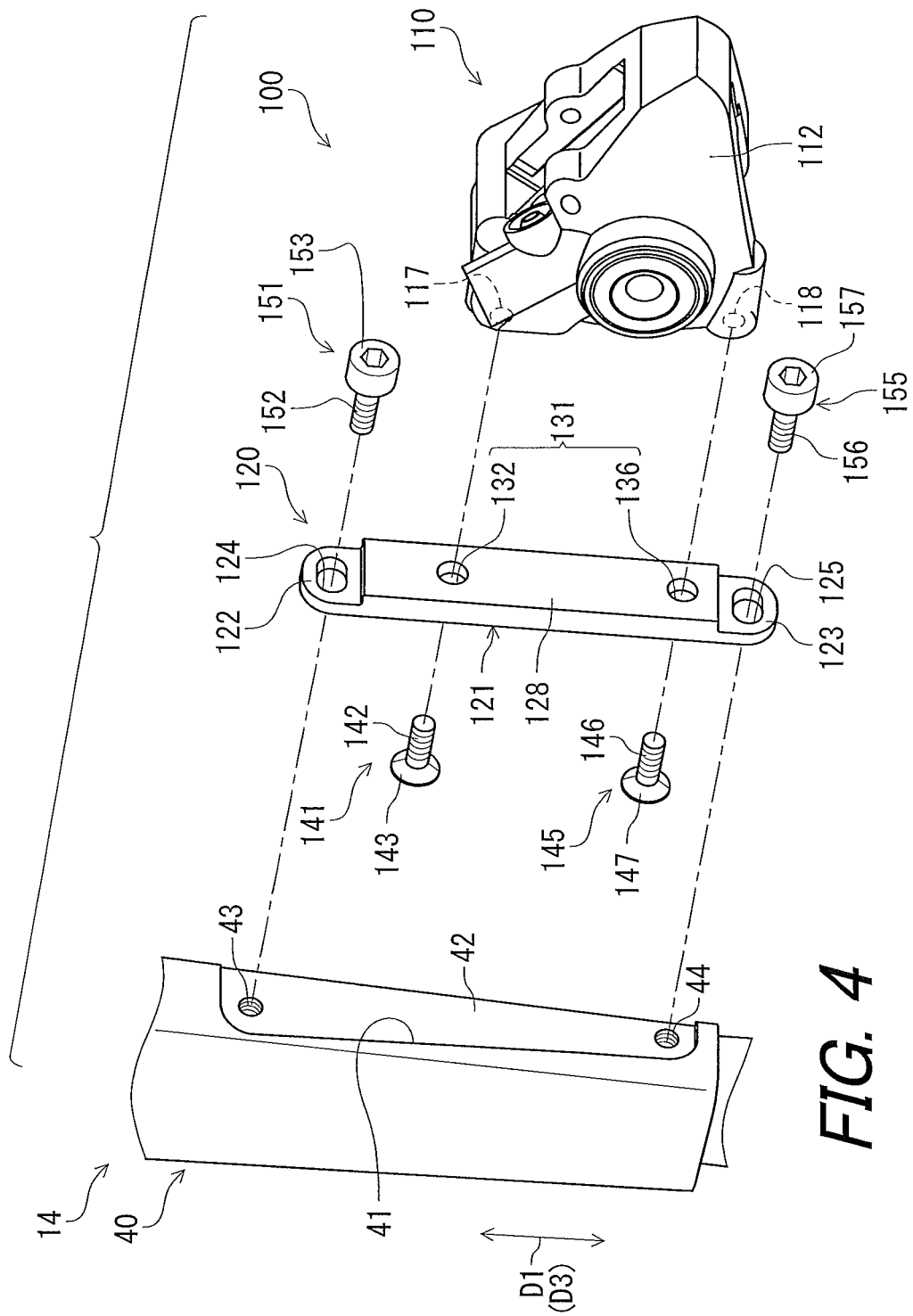
FIG. 4 is an exploded perspective view of the bicycle brake caliper assembly illustrated in FIG. 2 (first position)

Referring to FIG. 4, the bicycle brake caliper assembly 100 is configured to be attached to the front fork 40 of the bicycle frame 14. The bicycle brake caliper assembly 100 includes the brake caliper 110, the base member 120, a first coupling member 141, and a second coupling member 145. In the brake caliper 110 depicted in FIG. 4, parts other than the housing 112 (e.g., the brake pads 76 and the pistons 74) are omitted. The brake caliper 110 is coupled to the base member 120 by the first coupling member 141 and the second coupling member 145. The base member 120 is attached to the front fork 40 by the first attaching member 151 and the second attaching member 155. The brake caliper 110 and the base member 120 are made of metallic material such as aluminum alloy or iron. As discussed below, the base member 120 is configured to be coupled to the brake caliper 110 and to be attached to the bicycle frame 14 (the front fork 40) such that relative position between the rotational axis A1 of the brake disc rotor 50 and the brake caliper 110 is adjustable in the radial direction D1 of the brake disc rotor 50.

The base member 120 extends in a longitudinal direction D3. The longitudinal direction D3 of the base member 120 is substantially parallel to the radial direction D1 of the brake disc rotor 50 in a state where the base member 120 is attached to the front fork 40 (FIG. 1). Namely, the base member 120 extends in the radial direction D1 in a state where the base member 120 is attached to the front fork 40.

The base member 120 includes a main body 121, a first end portion 122, and a second end portion 123. In the first embodiment, the main body 121, the first end portion 122, and the second end portion 123 are integrally provided as a one piece unitary member. The main body 121 has a plate shape and extends in the longitudinal direction D3 (in the radial direction D1). The first end portion 122 is opposite to the second end portion 123 with respect to the main body 121. The first end portion 122 is disposed at one end of the main body 121. The second end portion 123 is disposed at the other end of the main body 121. The base member 120 includes a first attaching through-hole 124 and a second attaching through-hole 125. The first attaching through-hole 124 is provided at the first end portion 122. The second attaching through-hole 125 is provided at the second end portion 123.

The base member 120 includes a caliper-side contact surface 128. The caliper-side contact surface 128 is flat and is provided on the main body 121. The caliper-side contact surface 128 is configured to contact the brake caliper 110 in a state where the base member 120 is coupled to the brake caliper 110.

The base member 120 further includes a coupling portion 131 at which the brake caliper 110 is coupled. The coupling portion 131 includes a first through-hole 132 and a second through-hole 136. The first through-hole 132 and the second through-hole 136 are provided on the main body 121. The second through-hole 136 is arranged apart from the first through-hole 132 in the radial direction D1 (in the longitudinal direction D3). The second attaching through-hole 125 is spaced apart from the first attaching through-hole 124 in the radial direction D1 (in the longitudinal direction D3). The first through-hole 132 and the second through-hole 136 are arranged between the first attaching through-hole 124 and the second attaching through-hole 125.

The first coupling member 141 is configured to couple the brake caliper 110 to the base member 120. The second coupling member 145 is configured to couple the brake caliper 110 to the base member 120. In FIG. 4, the first coupling member 141 passes through the first through-hole 132 and the second coupling member 145 passes through the second through-hole 136 in a state where the base member 120 is coupled to the brake caliper 110 with the first coupling member 141 and the second coupling member 145. The first coupling member 141 is a countersunk head bolt and includes a first external thread 142 and a first countersunk head 143. The second coupling member 145 is a countersunk head bolt and includes a second external thread 146 and a second countersunk head 147. In the first embodiment, the second coupling member 145 has substantially the same shape as that of the first coupling member 141. It should be understood that the second coupling member 145 has a shape different from that of the first coupling member 141.

In a state where the base member 120 is coupled to the brake caliper 110 with the first coupling member 141 and the second coupling member 145, the base member 120 is attached to an attachment portion 41 of the front fork 40 by the first attaching member 151 and the second attaching member 155.

The attachment portion 41 of the front fork 40 is recessed and includes a support surface 42, and threaded holes 43 and 44. The support surface 42 is configured to contact the base member 120. The threaded holes 43 and 44 are provided on the support surface 42. The base member 120 is disposed within the attachment portion 41 in a state where the base member 120 is attached to the front fork 40 with the first attaching member 151 and the second attaching member 155.

The first attaching member 151 is a hexagon socket head bolt and includes a first external thread 152 and a first hexagon socket head 153. In FIG. 4, the first external thread 152 is screwed in the threaded hole 43 through the first attaching through-hole 124, and the first end portion 122 of the base member 120 is secured to the attachment portion 41 of the front fork 40 with the first attaching member 151.

The second attaching member 155 is a hexagon socket head bolt and includes a second external thread 156 and a second hexagon socket head 157. In FIG. 4, the second external thread 156 is screwed in the threaded hole 44 through the second attaching through-hole 125, and the second end portion 123 of the base member 120 is secured to the attachment portion 41 of the front fork 40 with the second attaching member 155.

Figure 5:
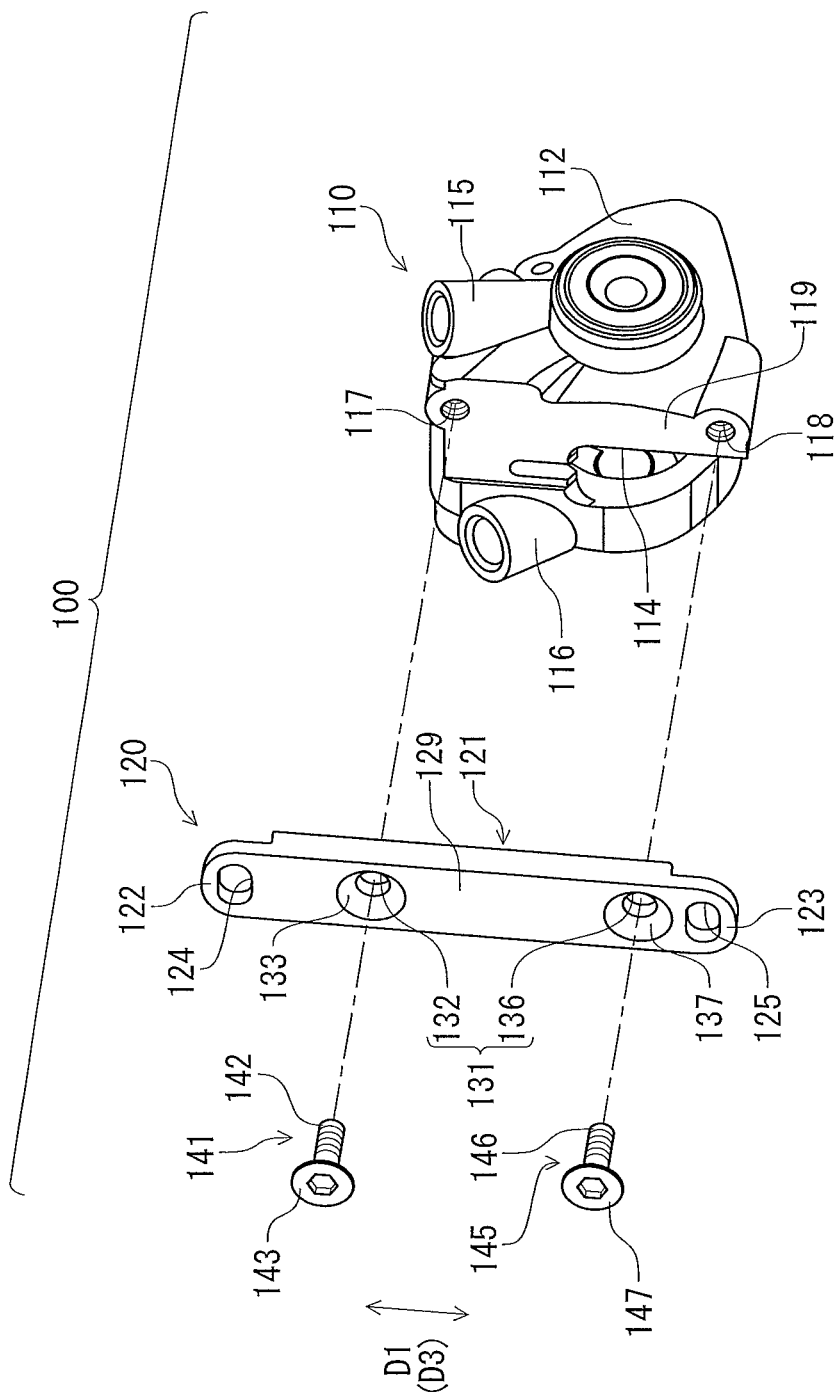
FIG. 5 is an exploded perspective view of the bicycle brake caliper assembly illustrated in FIG. 2 (first position)

Referring to FIG. 5, the housing 112 of the brake caliper 110 includes a connection port 115, a bleed port 116, a slit 114, and an attachment rear surface 119. The connection port 115 and the bleed port 116 are in fluid communication with the caliper fluid passage 58 (FIG. 3). The hydraulic brake hose 86 is connected with the connection port 115 via the banjo 87 (FIG. 2). A bleed nipple (not shown) is coupled to the bleed port 116. The slit 114 extends such that an outer friction portion of the brake disc rotor is disposed in the slit 114. The attachment rear surface 119 is flat and is configured to be contact the caliper-side contact surface 128 (FIG. 4) of the base member 120 in a state where the brake caliper 110 is coupled to the base member 120.

The brake caliper 110 further includes a first threaded hole 117 and a second threaded hole 118. The first threaded hole 117 and the second threaded hole 118 are provided on the attachment rear surface 119. A distance between the first threaded hole 117 and the second threaded hole 118 is substantially the same as a distance between the first through-hole 132 and the second through-hole 136. In FIG. 5, the first external thread 142 of the first coupling member 141 is screwed in the first threaded hole 117, and the second external thread 146 of the second coupling member 145 is screwed in the second threaded hole 118.

The base member 120 includes a frame-side contact surface 129 disposed on a side opposite to the brake caliper 110 with respect to the base member 120. The frame-side contact surface 129 is flat and is provided on the main body 121, the first end portion 122, and the second end portion 123. The frame-side contact surface 129 is configured to contact the support surface 42 (FIG. 4) of the front fork 40 in a state where the base member 120 is attached to the front fork 40.

As seen in FIG. 5, the first through-hole 132 includes a first tapered surface 133 provided on the frame-side contact surface 129. The second through-hole 136 includes a second tapered surface 137 provided on the frame-side contact surface 129. In a state where the base member 120 is coupled to the brake caliper 110 with the first coupling member 141, the first countersunk head 143 of the first coupling member 141 contacts the first tapered surface 133 of the first through-hole 132 and is disposed within a space defined by the first tapered surface 133, preventing the first countersunk head 143 from protruding beyond the frame-side contact surface 129 toward the front fork 40. In a state where the base member 120 is coupled to the brake caliper 110 with the second coupling member 145, the second countersunk head 147 of the second coupling member 145 contacts the second tapered surface 137 of the second through-hole 136 and is disposed within a space defined by the second tapered surface 137, preventing the second countersunk head 147 from protruding beyond the frame-side contact surface 129 toward the front fork 40.

Figure 6C:
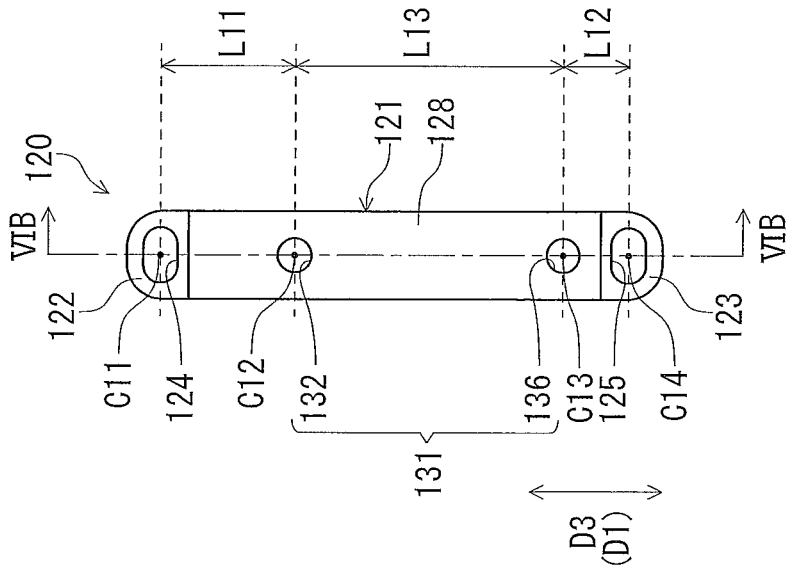
FIG. 6C is a front view of the base member illustrated in FIG. 5.
Figure 6B:
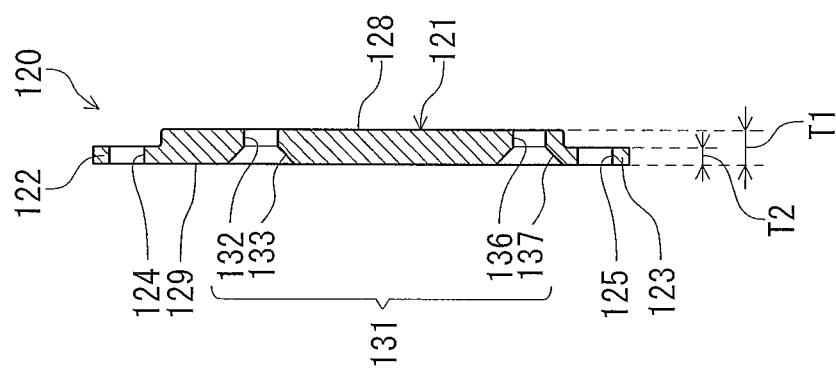
FIG. 6B is a partial cross sectional view of the base member taken along line VIB-VIB of FIG. 6C.
Figure 6A:
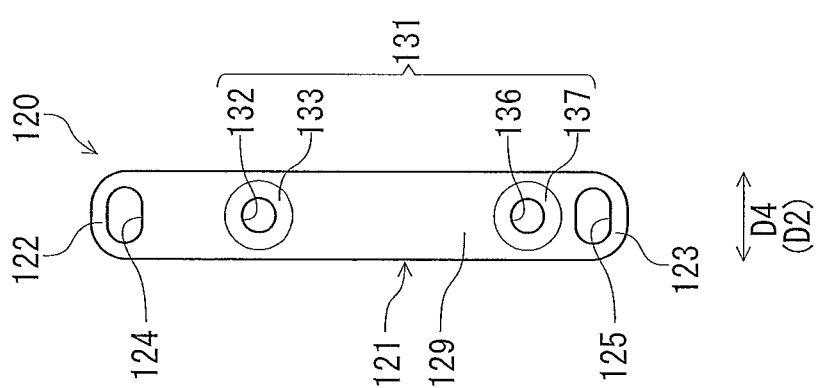
FIG. 6A is a back view of a base member illustrated in FIG. 5.

Referring to FIGS. 6A and 6B, the first through-hole 132 has substantially the same shape as that of the second through-hole 136. The first tapered surface 133 has substantially the same shape as that of the second tapered surface 137. The first tapered surface 133 is provided at an end portion of the first through-hole 132. The second tapered surface 137 is provided at an end portion of the second through-hole 136.

As seen in FIG. 6A, the first attaching through-hole 124 and the second attaching through-hole 125 extend in a transverse direction D4 of the base member 120. The transverse direction D4 is perpendicular to the longitudinal direction D3 of the base member 120 and is defined along the caliper-side contact surface 128 and the frame-side contact surface 129. The transverse direction D4 is substantially parallel to the axial direction D2 of the brake disc rotor 50 in a state where the base member 120 is attached to the front fork 40 of the bicycle frame 14. Namely, the first attaching through-hole 124 and the second attaching through-hole 125 extend in the axial direction D2 of the brake disc rotor 50 in a state where the base member 120 is attached to the bicycle frame 14. Since the first attaching through-hole 124 and the second attaching through-hole 125 extend in the axial direction D2, the relative position between the bicycle brake caliper assembly 100 and the brake disc rotor 50 is adjustable in the axial direction D2. It should be understood that the first attaching through-hole 124 and the second attaching through-hole 125 can be circular through-holes.

Referring to FIG. 6B, a thickness of the first end portion 122 is substantially the same as a thickness of the second end portion 123. A thickness T1 of the main body 121 is greater than a thickness T2 of the first end portion 122 and the second end portion 123.

Referring to FIG. 6C, a distance L11 between a center C11 of the first attaching through-hole 124 and a center C12 of the first through-hole 132 is different from a distance L12 between a center C14 of the second attaching through-hole 125 and a center C13 of the second through-hole 136. More specifically, the distance L11 between the center C11 of the first attaching through-hole 124 and the center C12 of the first through-hole 132 is greater than the distance L12 between the center C14 of the second attaching through-hole 125 and the center C13 of the second through-hole 136. The distances L11 and L12 are smaller than a distance L13 between the center C12 of the first through-hole 132 and the center C13 of the second through-hole 136. Namely, the base member 120 has an asymmetrical shape in the longitudinal direction D3. Since the distance L11 is different from the distance L12, turning upside down the base member 120 can change a position of the coupling portion 131 in the radial direction D1.

Figure 7:
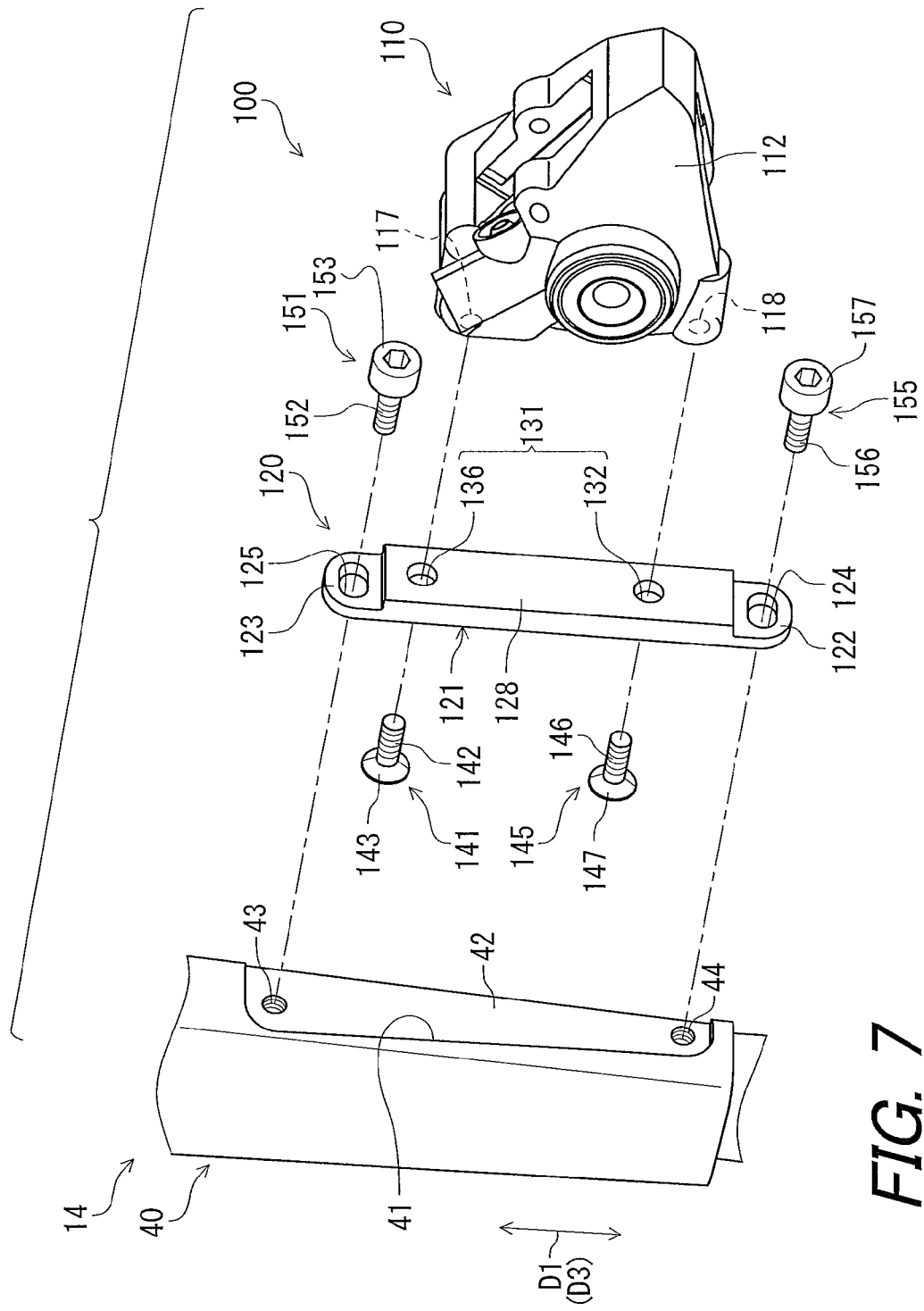
FIG. 7 is an exploded perspective view of the bicycle brake caliper assembly illustrated in FIG. 2 (second position)

Referring to FIGS. 4 and 7, the base member 120 is attached to the bicycle frame 14 with one of a first orientation and a second orientation. FIG. 4 illustrates the base member 120 that is disposed to be attached to the front fork 40 with the first orientation. FIG. 7 illustrates the base member 120 that is disposed to be attached to the front fork 40 with the second orientation.

As seen in FIG. 4, the first end portion 122 is disposed at an upper position and the second end portion 123 is disposed at a lower position in a state where the base member 120 is attached to the front fork 40 with the first orientation. As seen in FIG. 7, the second end portion 123 is disposed at an upper position and the first end portion 122 is disposed at a lower position in a state where the base member 120 is attached to the front fork 40 with the second orientation. Namely, the base member 120 disposed with the second orientation is upside-down in the radial direction D1 with respect to the base member 120 disposed with the first orientation.

As seen in FIG. 4, the first external thread 142 of the first coupling member 141 is screwed in the first threaded hole 117 through the first through-hole 132 and the second external thread 146 of the second coupling member 145 is screwed in the second threaded hole 118 through the second through-hole 136 in a state where the base member 120 is attached to the bicycle frame 14 with the first orientation. The first attaching member 151 passes through the first attaching through-hole 124 to attach the base member 120 to the bicycle frame 14. The second attaching member 155 passes through the second attaching through-hole 125 to attach the base member 120 to the bicycle frame 14. The first end portion 122 of the base member 120 is secured to the attachment portion 41 of the front fork 40 with the first attaching member 151 and the threaded hole 43. The second end portion 123 of the base member 120 is secured to the attachment portion 41 of the front fork 40 with the second attaching member 155 and the threaded hole 44.

As seen in FIG. 7, the first external thread 142 is screwed in the first threaded hole 117 through the second through-hole 136 and the second external thread 146 is screwed in the second threaded hole 118 through the first through-hole 132 in a state where the base member 120 is attached to the bicycle frame 14 with the second orientation. The first attaching member 151 passes through the second attaching through-hole 125 to attach the base member 120 to the bicycle frame 14. The second attaching member 155 passes through the first attaching through-hole 124 to attach the base member 120 to the bicycle frame 14. The second end portion 123 of the base member 120 is secured to the attachment portion 41 of the front fork 40 with the first attaching member 151 and the threaded hole 43. The first end portion 122 of the base member 120 is secured to the attachment portion 41 of the front fork 40 with the second attaching member 155 and the threaded hole 44.

FIG. 8A is a side elevational view of the bicycle brake caliper assembly 100 in a state where the base member 120 is attached to the front fork 40 with the first orientation. FIG. 8B is a side elevational view of the bicycle brake caliper assembly 100 in a state where the base member 120 is attached to the front fork 40 with the second orientation. FIG. 8A corresponds to FIG. 4, and FIG. 8B corresponds to FIG. 7.

Referring to FIGS. 8A and 8B, the bicycle brake caliper assembly 100 can be in two different states respectively corresponding to the brake disc rotor 50 and a brake disc rotor 55 which has an outer diameter R2 greater than an outer diameter R1 of the brake disc rotor 50. More specifically, the base member 120 is configured to be coupled to the brake caliper 110 and to be attached to the bicycle frame 14 (the front fork 40) such that relative position between the rotational axis A1 of the brake disc rotors 50 and 55 and the brake caliper 110 is adjustable in the radial direction D1 of the brake disc rotors 50 and 55. The base member 120 is configured such that a first position P11 of the coupling portion 131 in a state where the base member 120 is attached to the bicycle frame 14 with the first orientation differs from a second position P12 of the coupling portion 131 in a state where the base member 120 is attached to the bicycle frame 14 with the second orientation, in the radial direction D1. In the first embodiment, the first and second positions P11 and P12 are defined on the basis of a center line of the second threaded hole 118, for example.

As seen in FIG. 8A, a first distance L17 is defined between the rotational axis A1 of the brake disc rotor 50 and the center line of the second threaded hole 118 in the radial direction D1 in a state where the base member 120 is attached to the front fork 40 with the first orientation. As seen in FIG. 8B, a second distance L18 is defined between the rotational axis A1 of the brake disc rotor 55 and the center line of the second threaded hole 118 in the radial direction D1 in a state where the base member 120 is attached to the front fork 40 with the second orientation. As seen in FIGS. 8A and 8B, the second distance L18 corresponding to the second orientation is greater than the first distance L17 corresponding to the first orientation. Accordingly, changing the orientation of the base member 120 relative to the front fork 40 and the brake caliper 110 allows the bicycle brake caliper assembly 100 to be adjusted to each of the brake disc rotors 50 and 55 having different outer diameters R1 and R2.

It should be understood that the orientations of the base member are not limited to the first and second orientations, and that the bicycle brake caliper assembly according to the present invention can be adjusted to each of three or more brake disc rotors having different outer diameters by changing, among three or more different orientations, the orientation of the base member relative to the bicycle frame and the brake caliper. Furthermore, it should be understood that the coupling portion 131 of the base member 120 is not limited to the first through-hole 132 and the second through-hole 136 and can have at least one through-hole such that the relative position between the rotational axis A1 and the brake caliper 110 is adjustable in the radial direction D1 by changing the orientation of the base member 120.

Second Embodiment

A bicycle brake caliper assembly 200 in accordance with a second embodiment of the present invention will be described below referring to FIGS. 9 to 12B. Elements having substantially the same function as those in the first embodiment will be numbered the same here, and will not be described again in detail.

In the first embodiment, the orientation of the base member 120 is changed in order to adjust the bicycle brake caliper assembly 100 to each of the brake disc rotors 50 and 55; however, the bicycle brake caliper assembly 200 can be adjusted to each of the brake disc rotors 50 and 55 by a base member 220 having a structure different from the base member 120 of the first embodiment.

Figure 9:
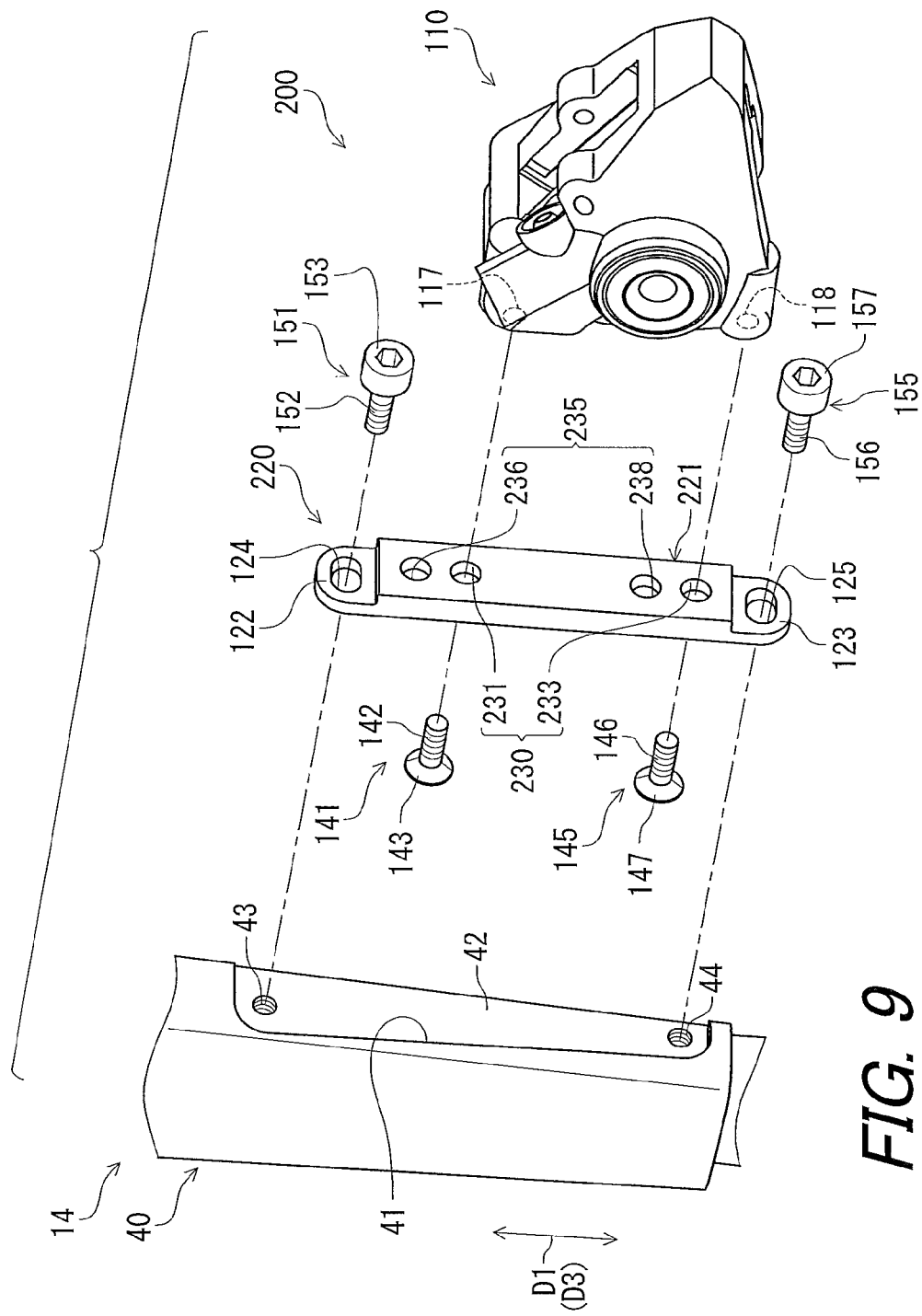
FIG. 9 is an exploded perspective view of the bicycle brake caliper assembly in accordance with a second embodiment of the present invention (first position)

Referring to FIG. 9, the bicycle brake caliper assembly 200 includes the brake caliper 110, the base member 220, the first coupling member 141, and the second coupling member 145. The first coupling member 141 and the second coupling member 145 are configured to couple the brake caliper 110 to the base member 220. As well as the base member 120 of the first embodiment, the base member 220 is configured to be coupled to the brake caliper 110 and to be attached to the bicycle frame 14 (the front fork 40) such that relative position between the rotational axis A1 of the brake disc rotor 50 and the brake caliper 110 is adjustable in a radial direction D1 of the brake disc rotor 50; however, the base member 220 has a structure different from the base member 120 of the first embodiment.

More specifically, the base member 220 includes a main body 221, the first end portion 122, and the second end portion 123. The main body 221, the first end portion 122, and the second end portion 123 are integrally provided as a one piece unitary member. The base member 220 is made of metallic material such as aluminum alloy or iron. The main body 221 has a plate shape and extends in the longitudinal direction D3 (in the radial direction D1). The first end portion 122 is opposite to the second end portion 123 with respect to the main body 221. The first end portion 122 is disposed at one end of the main body 221. The second end portion 123 is disposed at the other end of the main body 221.

As seen in FIG. 9, the base member 220 further includes a first coupling portion 230 at which the brake caliper 110 is coupled, and a second coupling portion 235 at which the brake caliper 110 is coupled. The first coupling portion 230 and the second coupling portion 235 are provided on the main body 221.

Figure 10:
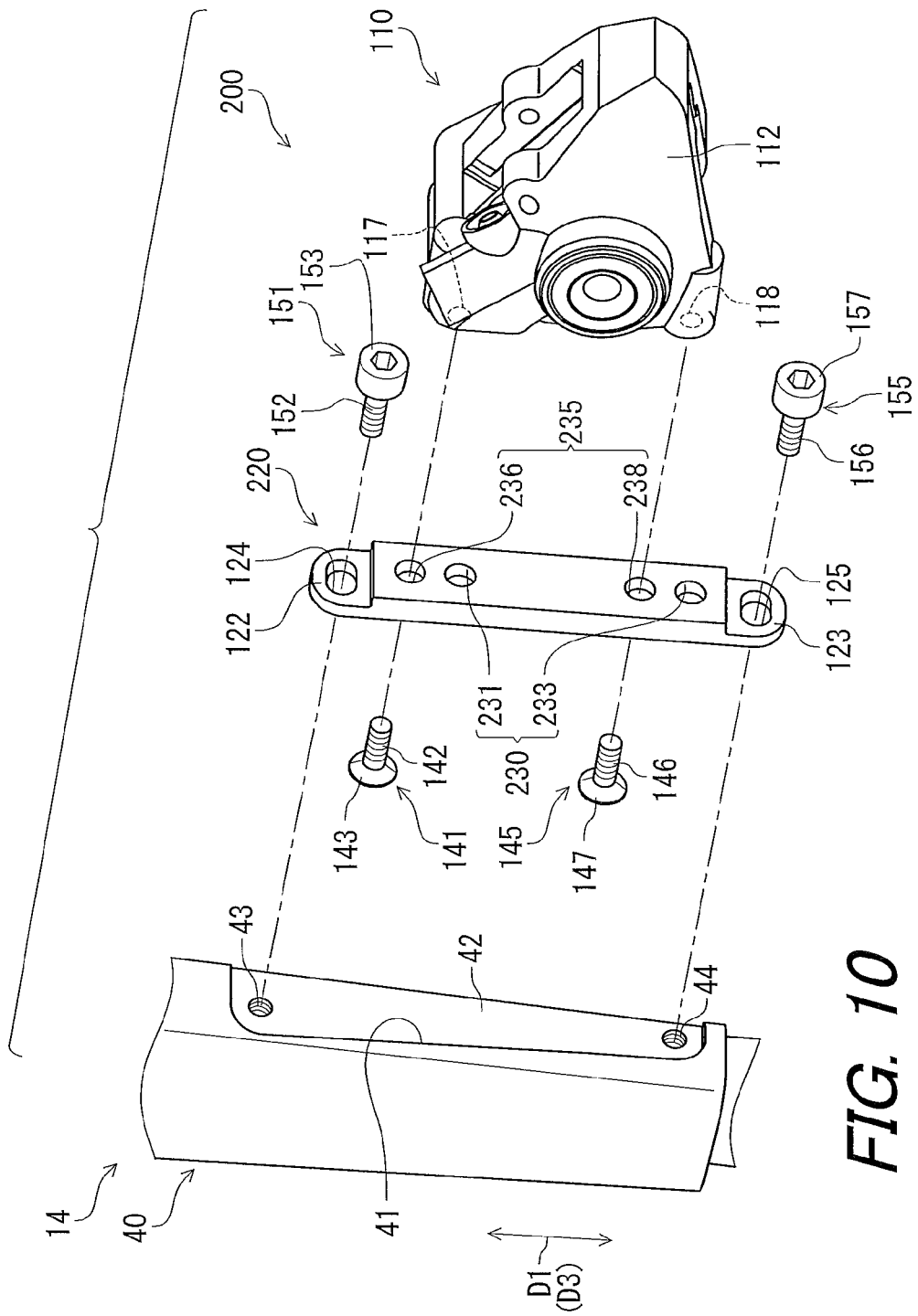
FIG. 10 is an exploded perspective view of the bicycle brake caliper assembly in accordance with the second embodiment of the present invention (second position)

Unlike the base member 120 of the first embodiment, the base member 220 includes four through-holes such that relative position between the rotational axis A1 and the brake caliper 110 is adjustable in the radial direction D1, instead of the first through-hole 132 and the second through-hole 136 of the base member 120. As seen in FIG. 9, the first coupling portion 230 includes a first through-hole 231 through which the first coupling member 141 passes, and a third through-hole 233 through which the second coupling member 145 passes. As seen in FIG. 10, the second coupling portion 235 includes a second through-hole 236 through which the first coupling member 141 passes, and a fourth through-hole 238 through which the second coupling member 145 passes. The first through-hole 231 is provided between the second through-hole 236 and the fourth through-hole 238 in the radial direction D1. The fourth through-hole 238 is provided between the first through-hole 231 and the third through-hole 233 in the radial direction D1. The first to fourth through-holes 231, 236, 233 and 238 are aligned in the radial direction D1 (in the longitudinal direction D3 of the base member 220).

As seen in FIGS. 9 and 10, the second coupling portion 235 is arranged apart from the first coupling portion 230 in the radial direction D1. More specifically, the first coupling portion 230 is closer to the second end portion 123 than to the first end portion 122. The second coupling portion 235 is closer to the first end portion 122 than to the second end portion 123.

As seen in FIG. 9, in a state where the brake caliper 110 is coupled to the base member 220 at the first coupling portion 230, the first coupling member 141 is screwed in the first threaded hole 117 of the brake caliper 110 through the first through-hole 231, and the second coupling member 145 is screwed in the second threaded hole 118 of the brake caliper 110 through the third through-hole 233, for example.

As seen in FIG. 10, in a state where the brake caliper 110 is coupled to the base member 220 at the second coupling portion 235, the first coupling member 141 is screwed in the first threaded hole 117 of the brake caliper 110 through the second through-hole 236, and the second coupling member 145 is screwed in the second threaded hole 118 of the brake caliper 110 through the fourth through-hole 238, for example.

Referring to FIGS. 11A and 11B, the first through-hole 231 includes a first tapered surface 232 provided on the frame-side contact surface 129. The second through-hole 236 includes a second tapered surface 237 provided on the frame-side contact surface 129. The third through-hole 233 includes a third tapered surface 234 provided on the frame-side contact surface 129. The fourth through-hole 238 includes a fourth tapered surface 239 provided on the frame-side contact surface 129. The first to fourth tapered surfaces 232, 237, 234 and 239 have substantially the same function as those of the first and second tapered surfaces 133 and 137 of the first embodiment. The first countersunk head 143 (or the second countersunk head 147) contacts the first tapered surface 232 of the first through-hole 231 and is provided within a space defined by the first tapered surface 232, preventing the first countersunk head 143 from protruding beyond the frame-side contact surface 129 toward the front fork 40. The first countersunk head 143 (or the second countersunk head 147) contacts the second tapered surface 237 of the second through-hole 236 and is provided within a space defined by the second tapered surface 237, preventing the first countersunk head 143 from protruding beyond the frame-side contact surface 129 toward the front fork 40. The second countersunk head 147 (or the first countersunk head 143) contacts the third tapered surface 234 of the third through-hole 233 and is provided within a space defined by the third tapered surface 234, preventing the second countersunk head 147 from protruding beyond the frame-side contact surface 129 toward the front fork 40. The second countersunk head 147 (or the first countersunk head 143) contacts the fourth tapered surface 239 of the fourth through-hole 238 and is provided within a space defined by the fourth tapered surface 239, preventing the second countersunk head 147 from protruding beyond the frame-side contact surface 129 toward the front fork 40.

As seen in FIG. 11C, a distance L21 is defined between the center C11 of the first attaching through-hole 124 and a center C22 of the second through-hole 236. A distance L22 is defined between a center C21 of the first through-hole 231 and the center C22 of the second through-hole 236. A distance L23 is defined between the center C21 of the first through-hole 231 and a center C24 of the fourth through-hole 238. A distance L24 is defined between a center C23 of the third through-hole 233 and the center C24 of the fourth through-hole 238. A distance L25 is defined between the center C14 of the second attaching through-hole 125 and the center C23 of the third through-hole 233. The distances L21, L22, L24 and L25 are substantially the same as one another, and are shorter than the distance L23. Namely, the base member 220 has a substantially symmetrical shape in the longitudinal direction D3. Accordingly, the base member 220 can be used to attach the brake caliper 110 to the front fork 40 regardless of the vertical orientation of the base member 220. For example, the base member 220 can be coupled to the brake caliper 110 in a state where the second end portion 123 is provided at an upper position.

Referring to FIGS. 12A and 12B, the bicycle brake caliper assembly 200 can be in two different states respectively corresponding to the brake disc rotor 50 and the brake disc rotor 55 which has an outer diameter R2 greater than an outer diameter R1 of the brake disc rotor 50. More specifically, the base member 220 is configured to be coupled to the brake caliper 110 and to be attached to the bicycle frame 14 (the front fork 40) such that relative position between the rotational axis A1 and the brake caliper 110 is adjustable in the radial direction D1.

The base member 220 is configured such that a first position P21 of the brake caliper 110 in a state where the brake caliper 110 is coupled to the base member 220 at the first coupling portion 230 differs from a second position P22 of the brake caliper 110 in a state where the brake caliper 110 is coupled to the base member 220 at the second coupling portion 235. In the second embodiment, the first and second positions P21 and P22 are defined on the basis of the center line of the second threaded hole 118, for example.

As seen in FIG. 12A, a first distance L27 is defined from the rotational axis A1 of the brake disc rotor 50 to the center line of the second threaded hole 118 in the radial direction D1 in a state where the brake caliper 110 is attached to the front fork 40 via the first coupling portion 230 of the base member 220. As seen in FIG. 12B, a second distance L28 is defined from the rotational axis A1 of the brake disc rotor 55 to the center line of the second threaded hole 118 in the radial direction D1 in a state where the brake caliper 110 is attached to the front fork 40 via the second coupling portion 235 of the base member 220. As seen in FIGS. 12A and 12B, the second distance L28 corresponding to the second coupling portion 235 is greater than the first distance L27 corresponding to the first coupling portion 230. Accordingly, changing the relative position between the base member 220 and the brake caliper 110 allows the bicycle brake caliper assembly 200 to be adjusted to each of the brake disc rotors 50 and 55 having different outer diameters R1 and R2.

It should be understood that the first coupling portion 230 and the second coupling portion 235 are not limited to the first to fourth through-holes 231, 236, 233 and 238 and can respectively have at least one through-hole can be provided in the base member as coupling portions at which the brake caliper is coupled, and that the bicycle brake caliper assembly according to the present invention can be adjusted to each of three or more brake disc rotors having different outer diameters by the at least one through-hole of the coupling portions.

Third Embodiment

A bicycle brake caliper assembly 300 in accordance with a third embodiment of the present invention will be described below referring to FIGS. 13 to 15B. Elements having substantially the same function as those in the first and second embodiments will be numbered the same here, and will not be described again in detail.

Figure 13:
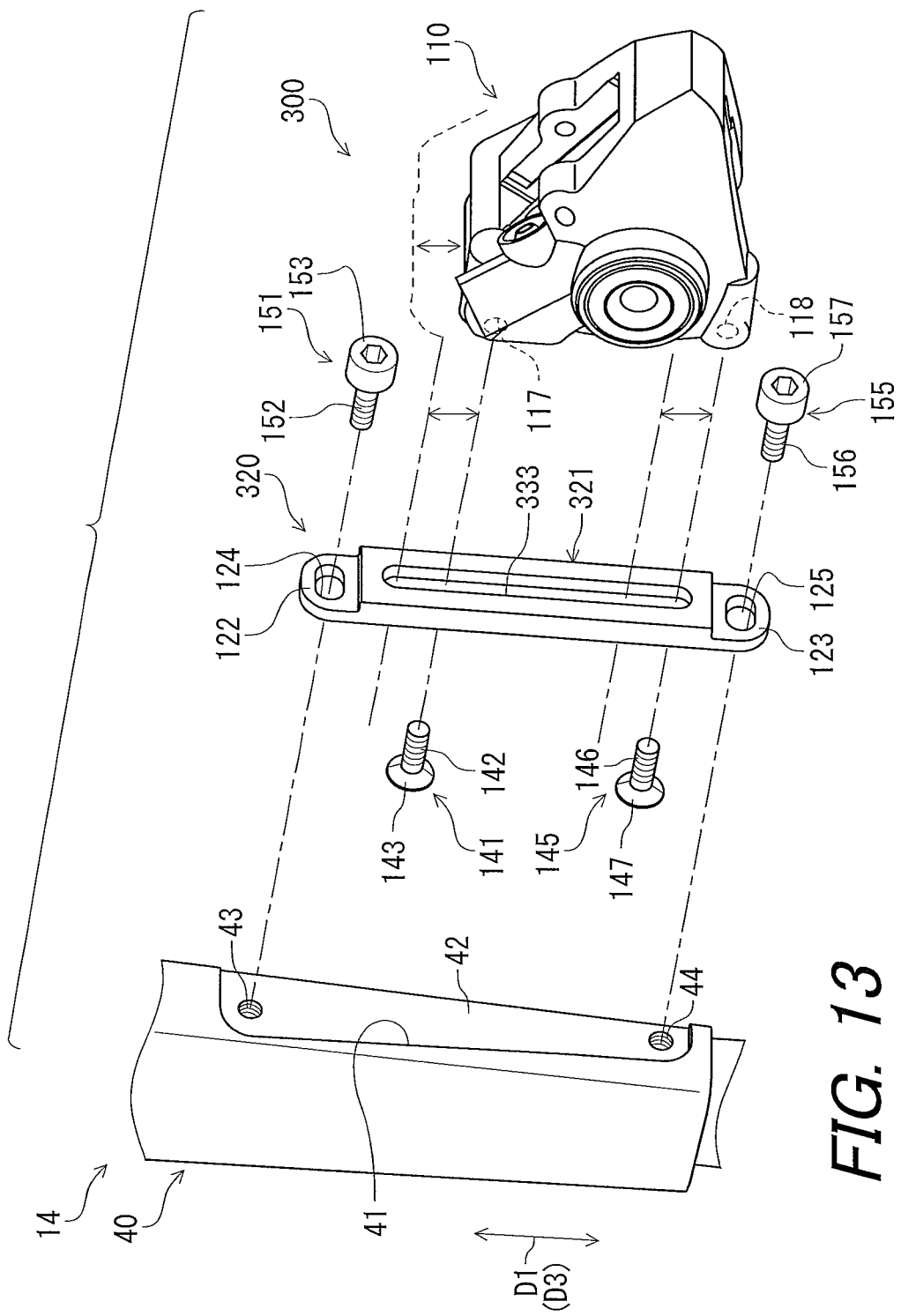
FIG. 13 is an exploded perspective view of the bicycle brake caliper assembly in accordance with a third embodiment of the present invention.

Referring to FIG. 13, the bicycle brake caliper assembly 300 comprises the brake caliper 110, a base member 320, the first coupling member 141, and the second coupling member 145. As well as the base members 120 and 220 of the first and second embodiments, the base member 320 is configured to be coupled to the brake caliper 110 and to be attached to the bicycle frame 14 (the front fork 40) such that relative position between the rotational axis A1 and the brake caliper 110 is adjustable in the radial direction D1; however, the base member 320 has a structure different from the base members 120 and 220 of the first and second embodiments.

More specifically, the base member 320 includes a main body 321, the first end portion 122, and the second end portion 123. The main body 321, the first end portion 122, and the second end portion 123 are integrally provided as a one piece unitary member. The base member 320 is made of metallic material such as aluminum alloy or iron. The main body 321 has a plate shape and extends in the longitudinal direction D3 (in the radial direction D1). The first end portion 122 is opposite to the second end portion 123 with respect to the main body 321. The first end portion 122 is disposed at one end of the main body 321. The second end portion 123 is disposed at the other end of the main body 321.

As seen in FIG. 13, the base member 320 includes an elongated through-hole 333 through which the first coupling member 141 and the second coupling member 145 pass. The elongated through-hole 333 extends in the radial direction D1 (in the longitudinal direction D3 of the base member 320). The elongated through-hole 333 extends from one end portion of the main body 321 to the other end portion of the main body 321 in the radial direction D1. The base member 320 is configured to be coupled to the brake caliper 110 and to be attached to the bicycle frame 14 (the front fork 40) such that relative position between the rotational axis and the brake caliper 110 is adjustable in the radial direction D1 within the elongated through-hole 333.

Referring to FIGS. 14A and 14B, the elongated through-hole 333 includes a tapered surface 334 provided on the frame-side contact surface 129. The first countersunk head 143 of the first coupling member 141 and the second countersunk head 147 of the second coupling member 145 contact the tapered surface 334 and are provided within a space defined by the tapered surface 334, preventing the first and second countersunk heads 143 and 147 from protruding beyond the frame-side contact surface 129 toward the front fork 40. As seen in FIGS. 14A to 14C, the base member 320 has a substantially symmetrical shape in the longitudinal direction D3. Accordingly, although the base member 320 is coupled to the brake caliper 110 in a state where the second end portion 123 is disposed at a lower position in this embodiment, the base member 320 can be attached to the brake caliper 110 and the front fork 40 regardless of the vertical orientation of the base member 320.

Figure 15A:
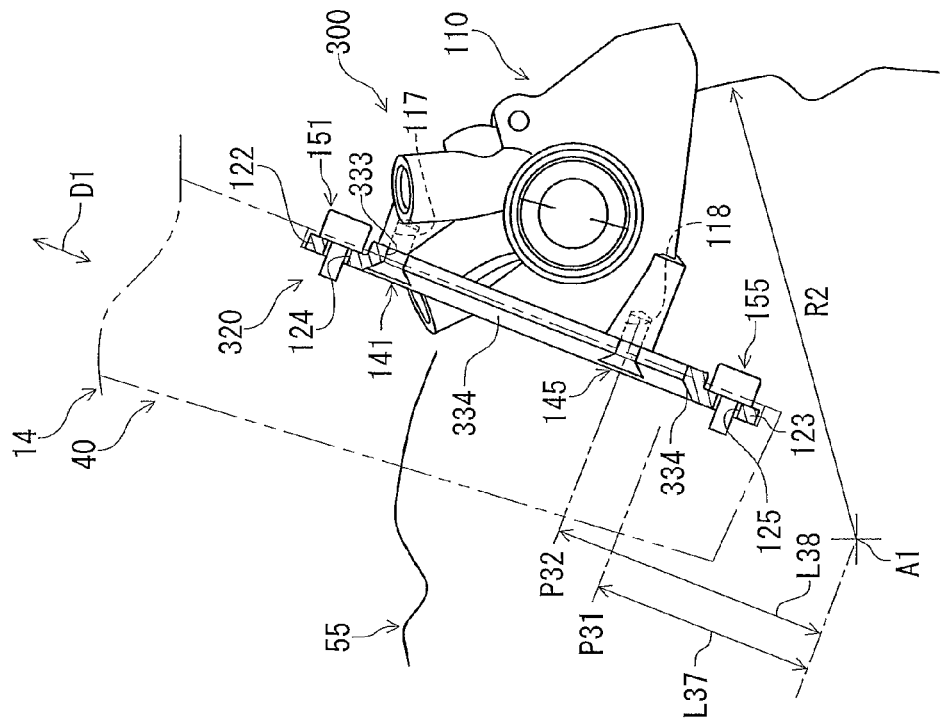
FIG. 15A is an elevational view of the bicycle brake caliper assembly illustrated in FIG. 13 (first position)
Figure 15B:
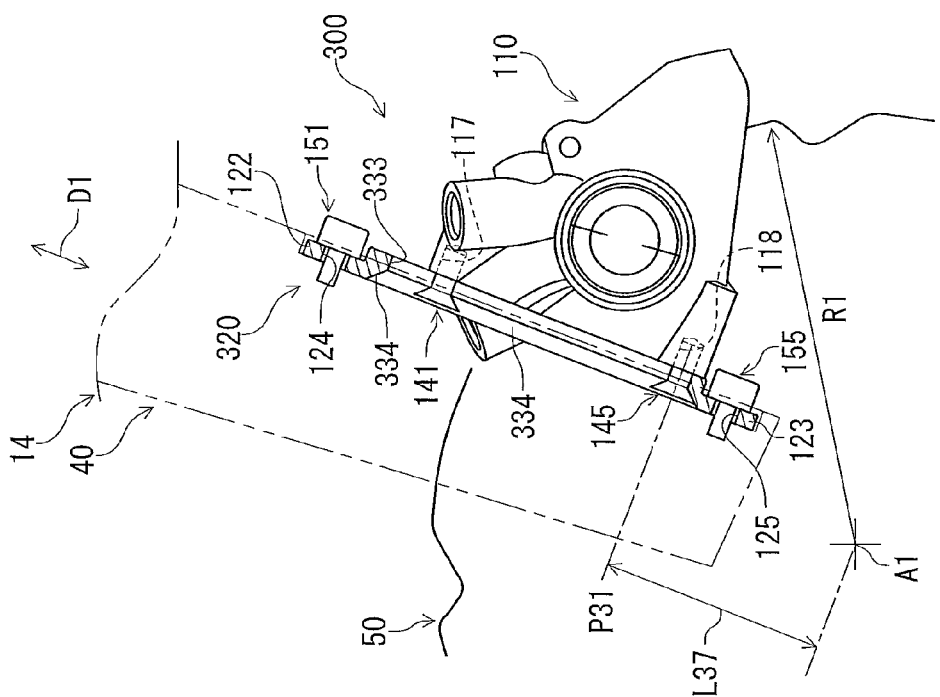
FIG. 15B is an elevational view of the bicycle brake caliper assembly illustrated in FIG. 13 (second position)

Referring to FIGS. 15A and 15B, the base member 320 is configured to be coupled to the brake caliper 110 and to be attached to the bicycle frame 14 (the front fork 40) such that relative position between the rotational axis A1 and the brake caliper 110 is adjustable in the radial direction D1 within the elongated through-hole 333.

As seen in FIG. 15A, a first distance L37 between the rotational axis A1 and the center line of the second threaded hole 118 is shortest in the radial direction D1 within the elongated through-hole 333 in a state where the brake caliper 110 is disposed at a first position P31. As seen in FIG. 15B, a second distance L38 between the rotational axis A1 and the center line of the second threaded hole 118 is greatest in the radial direction D1 within the elongated through-hole 333 in a state where the brake caliper 110 is disposed at a second position P32. With the elongated through-hole 333, the relative position between the rotational axis A1 and the brake caliper 110 is adjustable in the radial direction D1 at a desired position within a range of the elongated through-hole 333. Accordingly, changing the relative position between the base member 320 and the brake caliper 110 allows the bicycle brake caliper assembly 300 to be adjusted to each of brake disc rotors 50 and 55 having different outer diameters R1 and R2. Furthermore, since the base member 320 includes the elongated through-hole 333, the bicycle brake caliper assembly 300 can be adjusted to other brake disc rotors having outer diameters which are greater than the outer diameter R1 and which are smaller than the outer diameter R2. It should be understood that the elongated through-hole 333 can be separated into a plurality of elongated through-holes.

Fourth Embodiment

A bicycle brake caliper assembly 400 in accordance with a fourth embodiment of the present invention will be described below referring to FIGS. 16 to 20B. Elements having substantially the same function as those in the first to third embodiments will be numbered the same here, and will not be described again in detail.

Figure 16:
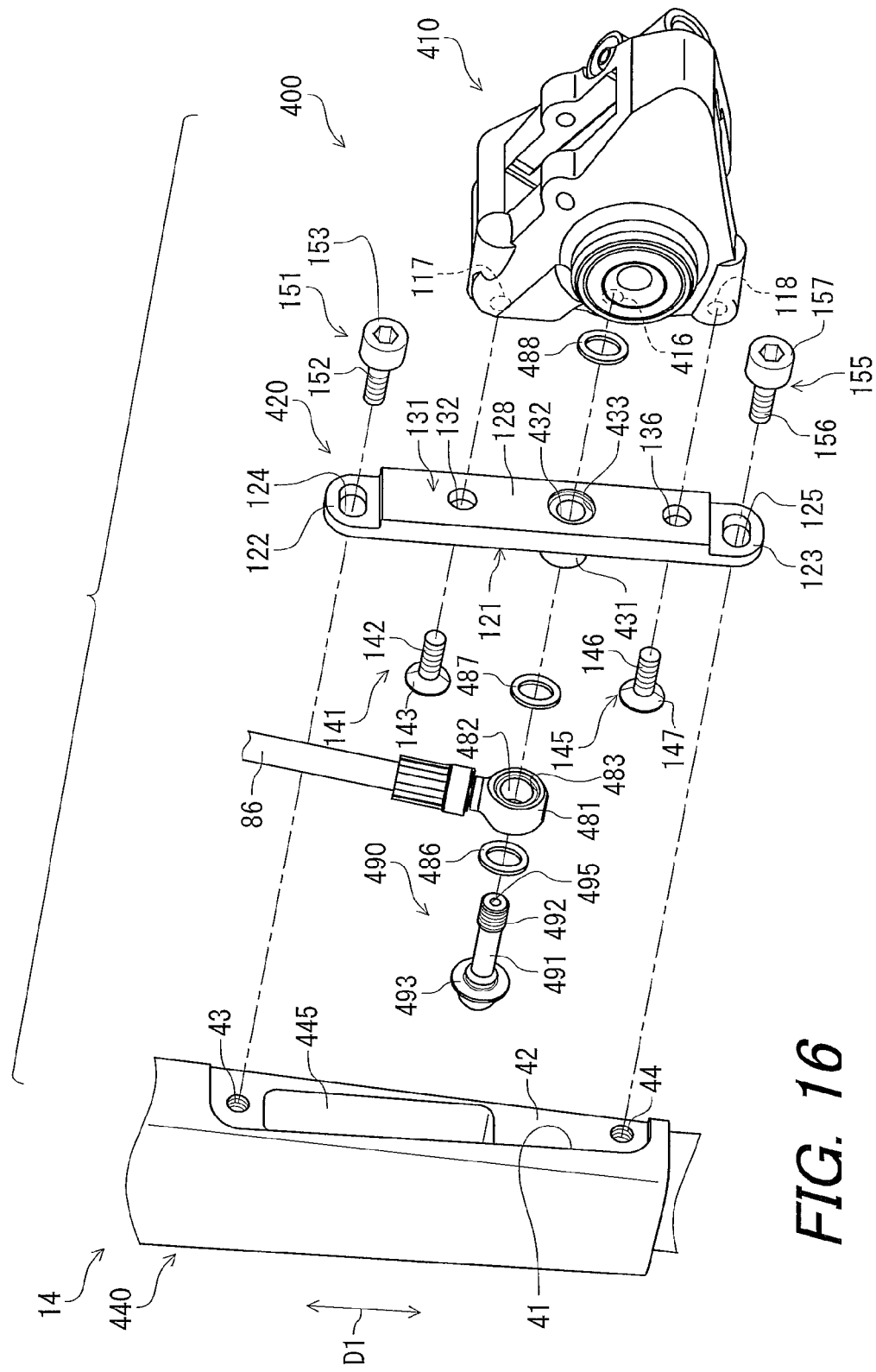
FIG. 16 is an exploded perspective view of the bicycle brake caliper assembly in accordance with a fourth embodiment of the present invention.

Referring to FIG. 16, the bicycle brake caliper assembly 400 comprises a brake caliper 410, a base member 420, the first coupling member 141, and the second coupling member 145. Unlike the above first to third embodiments, a banjo 481 is connected with the brake caliper 410 through the base member 420. The front fork 440 of the bicycle frame 14 includes a cavity 445 in which the banjo 481 is disposed.

As well as the brake caliper 110 of the first embodiment, the brake caliper 410 is configured to apply a braking force on a brake disc rotor configured to be rotatable about the rotational axis A1. The base member 420 is configured to be coupled to the brake caliper 410 and to be attached to a bicycle frame 14 such that relative position between the rotational axis A1 of the brake disc rotor and the brake caliper 410 is adjustable in the radial direction D1 of the brake disc rotor. The first coupling member 141 is configured to couple the brake caliper 410 to the base member 420. The second coupling member 145 is configured to couple the brake caliper 410 to the base member 420.

As well as the base member 120 of the first embodiment, the base member 420 includes the coupling portion 131 at which the brake caliper 410 is coupled. The base member 420 is attached to the bicycle frame 14 with one of a first orientation and a second orientation. The base member 420 is configured such that a position of the coupling portion 131 in a state where the base member 420 is attached to the bicycle frame 14 (the front fork 40) with the first orientation differs from a position of the coupling portion 131 in a state where the base member 420 is attached to the bicycle frame 14 with the second orientation, in the radial direction D1. Namely, the base member 420 has substantially the same function as that of the base member 120 of the first embodiment.

The coupling portion 131 includes the first through-hole 132 and the second through-hole 136. In FIG. 16, the first coupling member 141 passes through the first through-hole 132, and the second coupling member 145 passes through the second through-hole 136, and the second through-hole 136 is arranged apart from the first through-hole 132 in the radial direction D1.

Figure 17:
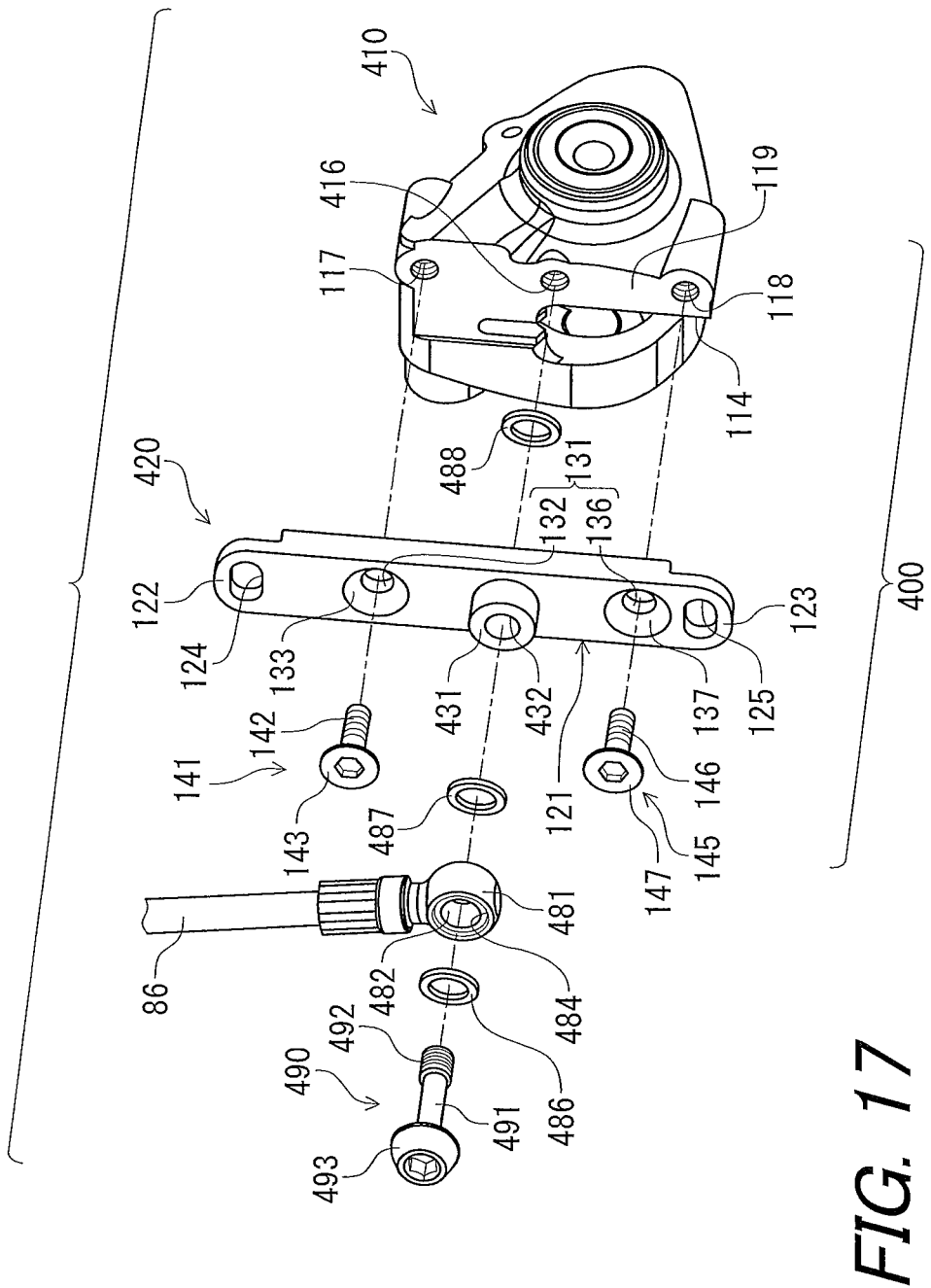
FIG. 17 is an exploded perspective view of the bicycle brake caliper assembly in accordance with the fourth embodiment of the present invention.

The base member 420 further includes a cylindrical protrusion 431, an additional through-hole 432, and an annular recess 433. The annular recess 433 is provided about the additional through-hole 432 on the caliper-side contact surface 128. A third seal member 488 is provided in the annular recess 433 between the base member 420 and the brake caliper 410. The cylindrical protrusion 431 is provided on the frame-side contact surface 129 and protrudes from the frame-side contact surface 129 (FIG. 17). As seen in FIGS. 16 and 17, the additional through-hole 432 extends through the main body 121 and the cylindrical protrusion 431.

As seen in FIG. 16, a fluid communicating member 490 passes through the additional through-hole 432. The fluid communicating member 490 is configured to fluidly communicate with the caliper fluid passage 58 (FIG. 3). The fluid communicating member 490 is a banjo bolt to attach the banjo 481 to the base member 420 and includes a shaft portion 491, an external thread 492, a head portion 493, and a fluid passage 495. The shaft portion 491 extends in a longitudinal direction of the fluid communicating member 490. The external thread 492 is provided at one end of the shaft portion 491. The head portion 493 is provided at the other end of the shaft portion 491. The fluid passage 495 is formed in the fluid communicating member 490 to fluidly connect the banjo 481 to the caliper fluid passage 58 (FIG. 3).

As seen in FIG. 16, the banjo 481 includes a through-hole 482 through which the fluid communicating member 490 passes. The hydraulic brake hose 86 is connected to the banjo 481. The banjo 481 further includes a first annular recess 483 disposed about the through-hole 482. The first annular recess 483 is provided on a side closer to the cylindrical protrusion 431 of the base member 420. A first seal member 487 is provided in the first annular recess 483 between the banjo 481 and the cylindrical protrusion 431.

As seen in FIG. 17, the banjo 481 further includes a second annular recess 484 disposed about the through-hole 482. The second annular recess 484 is provided on an opposite side of the first annular recess 483. A second seal member 486 is provided in the second annular recess 484 between the banjo 481 and the head portion 493 of the fluid communicating member 490.

The brake caliper 410 includes an additional threaded hole 416 provided on the attachment rear surface 119. The external thread 492 of the fluid communicating member 490 is screwed in the additional threaded hole 416. The additional threaded hole 416 is arranged at a middle position between the first threaded hole 117 and the second threaded hole 118. The additional threaded hole 416 is disposed at a position corresponding to the additional through-hole 432 of the base member 420.

Figure 18C:
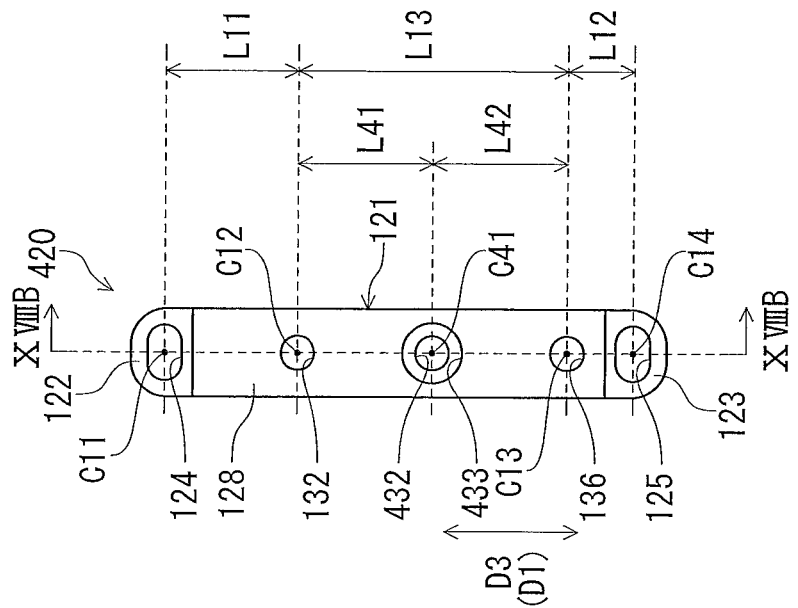
FIG. 18C is a front view of the base member illustrated in FIG. 17.
Figure 18B:
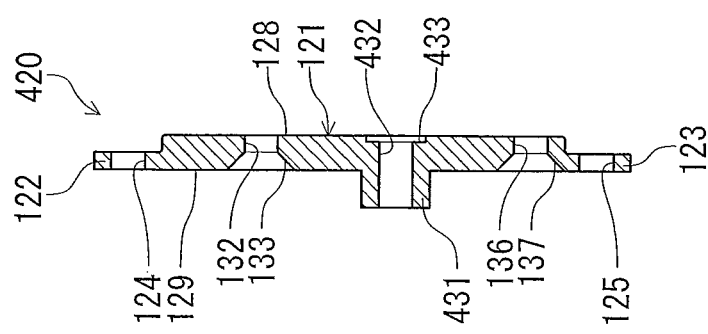
FIG. 18B is a partial cross sectional view of the base member taken along line XVIIIB-XVIIIB of FIG. 18C.
Figure 18A:
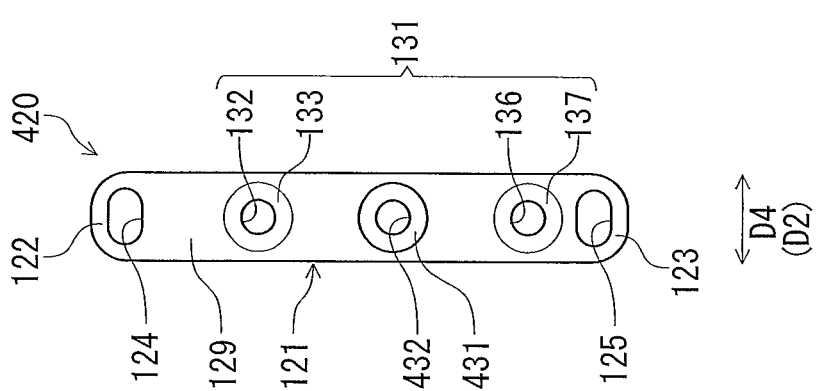
FIG. 18A is a back view of a base member illustrated in FIG. 17.

As seen in FIGS. 18A to 18C, the additional through-hole 432 is arranged at a middle position between the first through-hole 132 and the second through-hole 136. A distance L41 between a center C41 of the additional through-hole 432 and the center C12 of the first through-hole 132 is substantially the same as a distance L42 between the center C41 of the additional through-hole 432 and the center C13 of the second through-hole 136.

Figure 19:
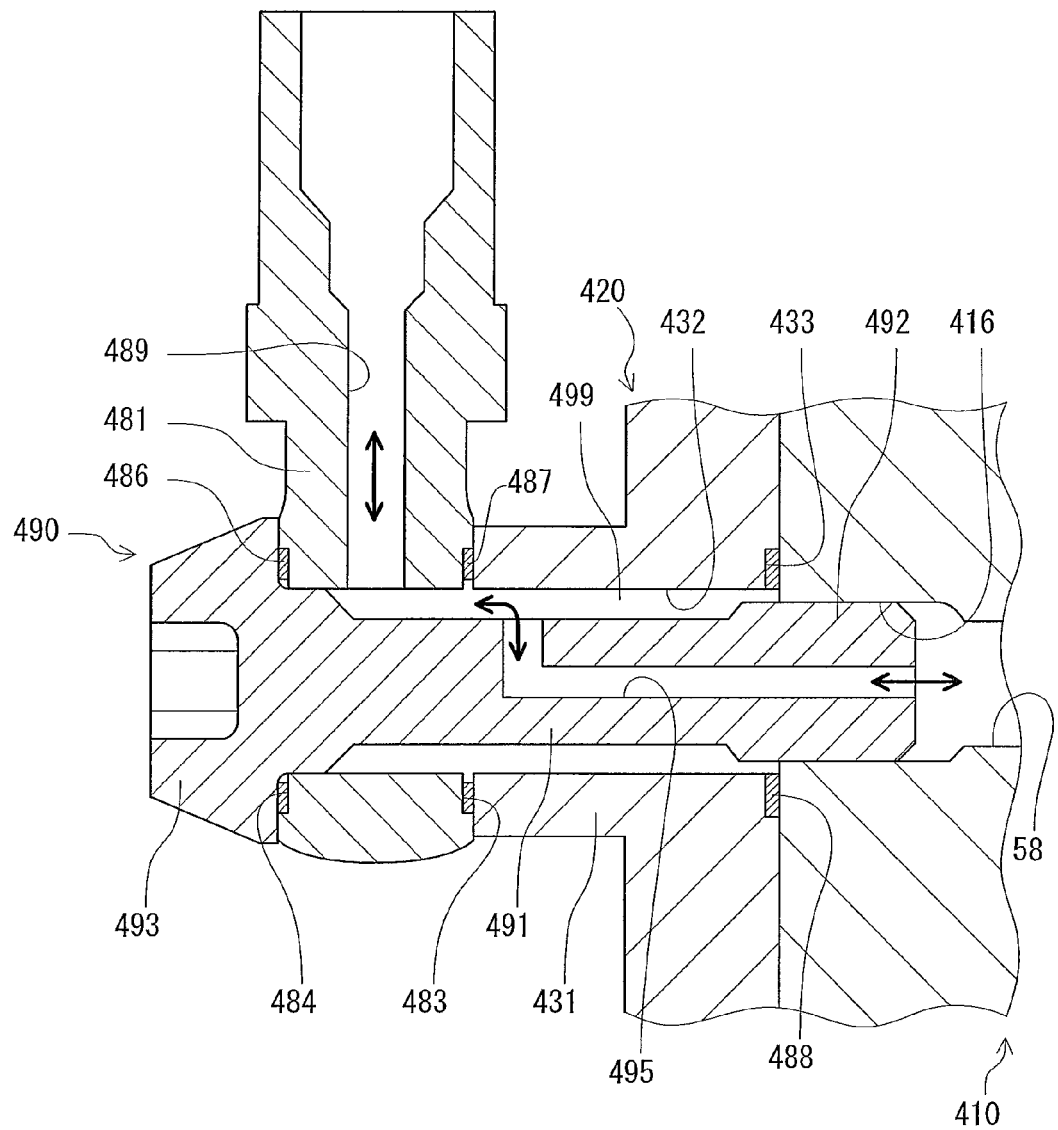
FIG. 19 is a partial cross sectional view of a fluid communicating member and surroundings thereof illustrated in FIG. 16.

Referring to FIG. 19, the banjo 481 includes a banjo fluid passage 489 in fluid communication with the hydraulic brake hose 86. The brake caliper 410 includes the caliper fluid passage 58 in fluid communication with the additional threaded hole 416. In a state where the banjo 481 is attached to the base member 420 with the fluid communicating member 490, a fluid passage space 499 is defined by the fluid communicating member 490, the banjo 481, and the base member 420. More specifically, the fluid passage space 499 has a substantially cylindrical shape and is defined by the shaft portion 491, the banjo 481, and the additional through-hole 432. The fluid passage space 499 is sealed by the first seal member 487, the second seal member 486, and the third seal member 488. The fluid passage space 499 is in fluid communication with the banjo fluid passage 489. The fluid passage 495 of the fluid communicating member 490 is configured to connect the fluid passage space 499 to the caliper fluid passage 58. Accordingly, the banjo fluid passage 489 is in fluid communication with the caliper fluid passage 58 via the fluid passage space 499 and the fluid passage 495.

Referring to FIGS. 20A and 20B, a front fork 450 of the bicycle frame 14 includes the cavity 445 and a hose passage 446. The cavity 445 is formed between the threaded holes 43 and 44 to contain the fluid communicating member 490 and the banjo 481 therein. The fluid communicating member 490 and the banjo 481 are disposed in the cavity 445 in a state where the bicycle brake caliper assembly 400 is attached to the front fork 440. The hose passage 446 extends along the front fork 440 from the cavity 445 to an upper portion of the front fork 440. The hose passage 446 includes an inlet opening (not shown) at the upper portion of the front fork 440. The hydraulic brake hose 86 extends through the hose passage 446 and is configured to connect the banjo 481 to the master cylinder 24 of the brake operating mechanism 23. The hydraulic brake hose 86 passes through the inlet opening (not shown) of the hose passage 446 and is connected to the master cylinder 24 mounted on the handlebar 15 (FIG. 3).

As seen in FIGS. 20A and 20B, the bicycle brake caliper assembly 400 can be in two different states respectively corresponding to the brake disc rotor 50 and the brake disc rotor 55 which has the outer diameter R2 greater than the outer diameter R1 of the brake disc rotor 50, as well as the bicycle brake caliper assembly 100 of the first embodiment. More specifically, the base member 420 is configured to be coupled to the brake caliper 410 and to be attached to a bicycle frame 14 such that relative position between the rotational axis A1 of the brake disc rotors 50 and 55 and the brake caliper 410 is adjustable in the radial direction D1 of the brake disc rotors 50 and 55. The base member 420 is configured such that the first position P11 of the coupling portion 131 in a state where the base member 420 is attached to the bicycle frame 14 with the first orientation differs from the second position P12 of the coupling portion 131 in a state where the base member 420 is attached to the bicycle frame 14 with the second orientation, in the radial direction D1. In the fourth embodiment, the first and second positions P11 and P12 are defined on the basis of a center line of the second threaded hole 118, for example.

As seen in FIGS. 20A and 20B, the second distance L18 corresponding to the second orientation is greater than the first distance L17 corresponding to the first orientation. Accordingly, changing the orientation of the base member 420 relative to the front fork 440 and the brake caliper 110 allows the bicycle brake caliper assembly 400 to be adjusted to each of brake disc rotors 50 and 55 having different outer diameters R1 and R2. Since the additional through-hole 432 is arranged at the middle position between the first through-hole 132 and the second through-hole 136, the fluid communicating member 490 can be attached to the base member 420 and the brake caliper 410 in a state where the base member 420 is coupled to the brake caliper 410 with each of the first orientation and the second orientation.

Furthermore, since the banjo 481 and the fluid communicating member 490 are disposed in the cavity 445 of the front fork 440, the banjo 481, the fluid communicating member 490, and the hydraulic brake hose 86 can be protected by the front fork 440.

Fifth Embodiment

A bicycle brake caliper assembly 500 in accordance with a fifth embodiment of the present invention will be described below referring to FIGS. 21 to 24B. Elements having substantially the same function as those in the first to fourth embodiments will be numbered the same here, and will not be described again in detail.

In the fourth embodiment, the fluid communicating member 490 is connected to the brake caliper 410 through the additional through-hole 432 of the base member 420; however, the fluid communicating member 490 can serve as a coupling member configured to couple the base member to the brake caliper instead of the first coupling member 141 of the above embodiments. In this fifth embodiment, the first coupling member 490 is referred as the fluid communicating member 490. The first coupling member 490 has substantially the same function and same structures as the fluid communicating member 490 of the fourth embodiment.

Figure 21:
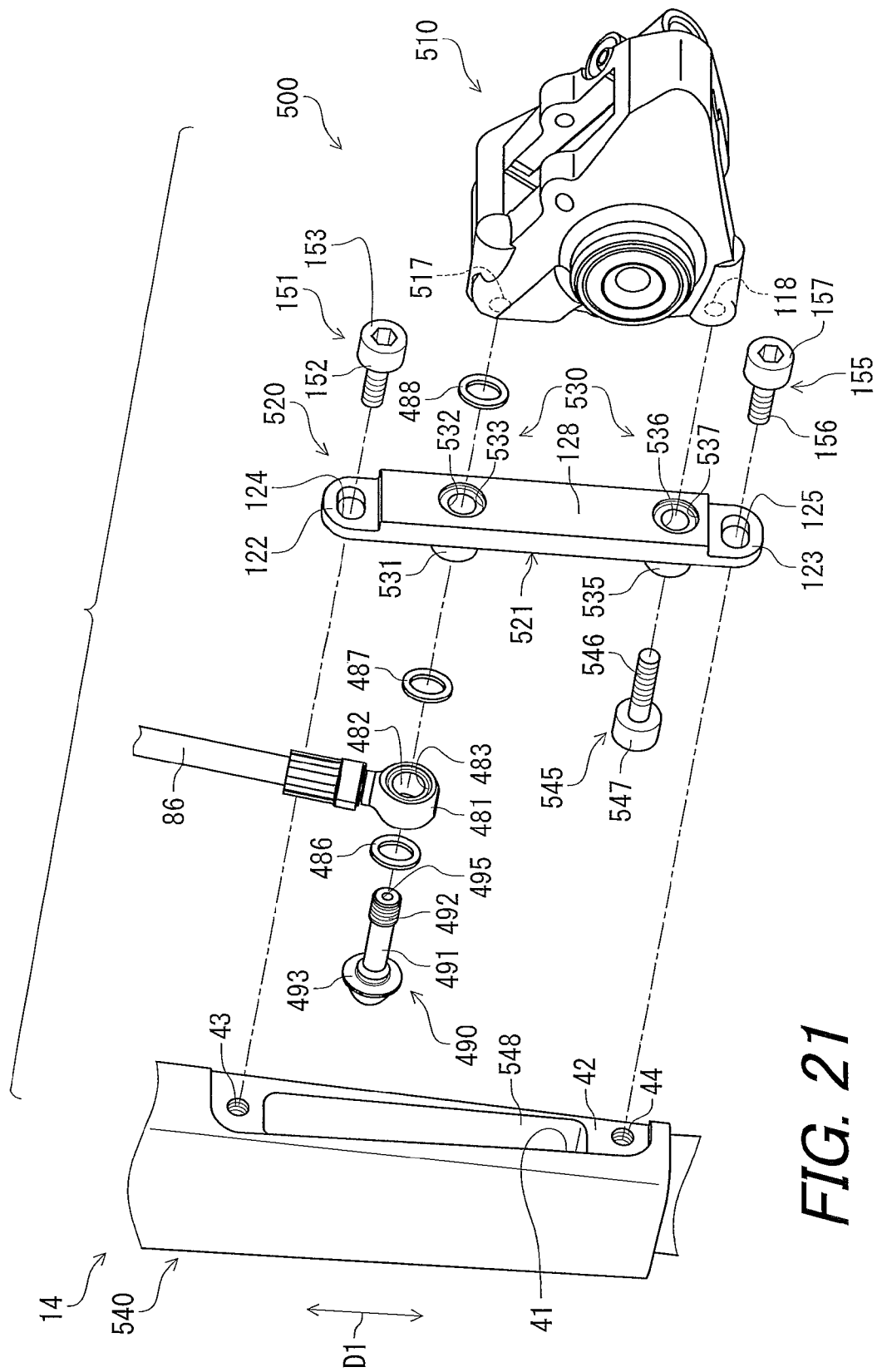
FIG. 21 is an exploded perspective view of the bicycle brake caliper assembly in accordance with a fifth embodiment of the present invention.

Referring to FIG. 21, the bicycle brake caliper assembly 500 comprises a brake caliper 510, a base member 520, the first coupling member 490, and a second coupling member 545. As well as the brake calipers of the above embodiments, the brake caliper 510 is configured to apply a braking force on a brake disc rotor configured to be rotatable about the rotational axis A1.

The base member 520 is configured to be coupled to the brake caliper 510 and to be attached to the bicycle frame 14 (the front fork 40) such that relative position between the rotational axis A1 and the brake caliper 510 is adjustable in the radial direction D1. The first coupling member 490 is configured to couple the brake caliper 510 to the base member 520. The second coupling member 545 includes an external thread 546 and a head portion 547.

The base member 520 is attached to the bicycle frame 14 with one of a first orientation and a second orientation as well as the base member 120 of the first embodiment. The base member 520 includes a coupling portion 530 at which the brake caliper 510 is coupled. The base member 520 is configured such that a position of the coupling portion 530 in a state where the base member 520 is attached to the bicycle frame 14 (the front fork 540) with the first orientation differs from a position of the coupling portion 530 in a state where the base member 520 is attached to the bicycle frame 14 with the second orientation, in the radial direction D1.

Figure 22:
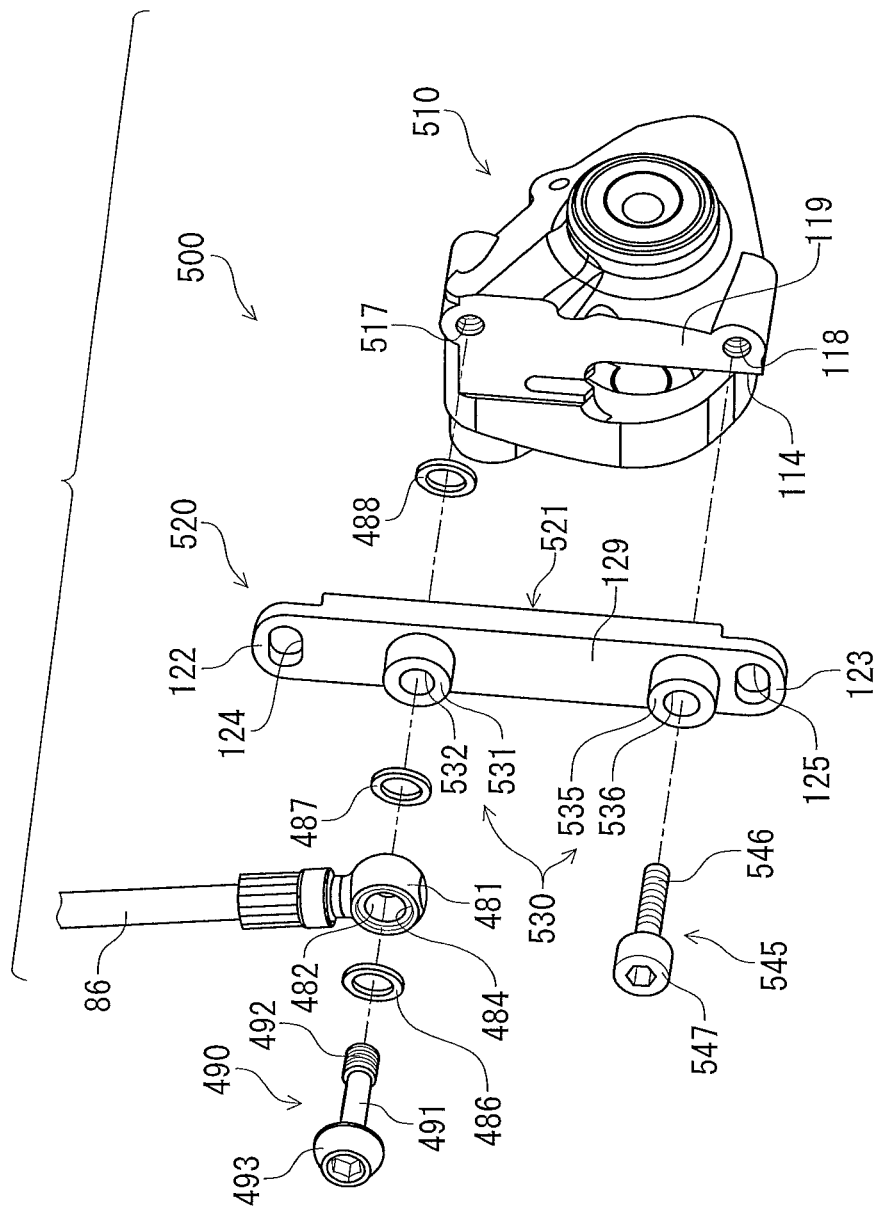
FIG. 22 is an exploded perspective view of the bicycle brake caliper assembly in accordance with the fifth embodiment of the present invention.

As seen in FIGS. 21 and 23A to 23C, the base member 520 includes a main body 521, the first end portion 122, the second end portion 123, and a coupling portion 530. The coupling portion 530 includes a first through-hole 532, a first cylindrical protrusion 531, a first annular recess 533, a second through-hole 536, a second cylindrical protrusion 535, and a second annular recess 537. The first cylindrical protrusion 531 is provided on the frame-side contact surface 129 and protrudes from the frame-side contact surface 129 (FIG. 22). The second cylindrical protrusion 535 is provided on the frame-side contact surface 129 and protrudes from the frame-side contact surface 129 (FIG. 22). The first through-hole 532 extends through the first cylindrical protrusion 531 and the main body 521 (FIG. 23B). The second through-hole 536 extends through the second cylindrical protrusion 535 (FIG. 23B). The first through-hole 532 and the second through-hole 536 are disposed at the same positions as the first through-hole 132 and the second through-hole 136 of the thirst embodiment in the base member 520. In FIGS. 21 and 22, the first coupling member 490 passes through the first through-hole 532, and the second coupling member 545 passes through the second through-hole 536.

As seen in FIGS. 21 and 23C, the first annular recess 533 is provided about the first through-hole 532 on the caliper-side contact surface 128. The second annular recess 537 is provided about the second through-hole 536 on the caliper-side contact surface 128. The third seal member 488 is provided in one of the first annular recess 533 and the second annular recess 537 in a state where the base member 520 is coupled to the brake caliper 510.

As seen in FIG. 21, the first coupling member 490 connects the banjo 481 and the base member 520 to the brake caliper 510. The first coupling member 490, the banjo 481, and the second coupling member 545 are provided in the cavity 548 of the front fork 540 of the bicycle frame 14 in a state where the bicycle brake caliper assembly 500 is attached to the front fork 540.

As seen in FIG. 22, the brake caliper 510 includes a first threaded hole 517 and the second threaded hole 118. The external thread 492 of the first coupling member 490 is screwed in the first threaded hole 517. The external thread 546 of the second coupling member 545 is screwed in the second threaded hole 118. The second coupling member 545 has substantially the same function as the first and second coupling members 141 and 145 of the first embodiment. The first coupling member 490 is configured to couple the brake caliper 510 to the base member 520 and provides the fluid passage 495 configured to communicate with the caliper fluid passage 58 (FIG. 24).

Figure 24:
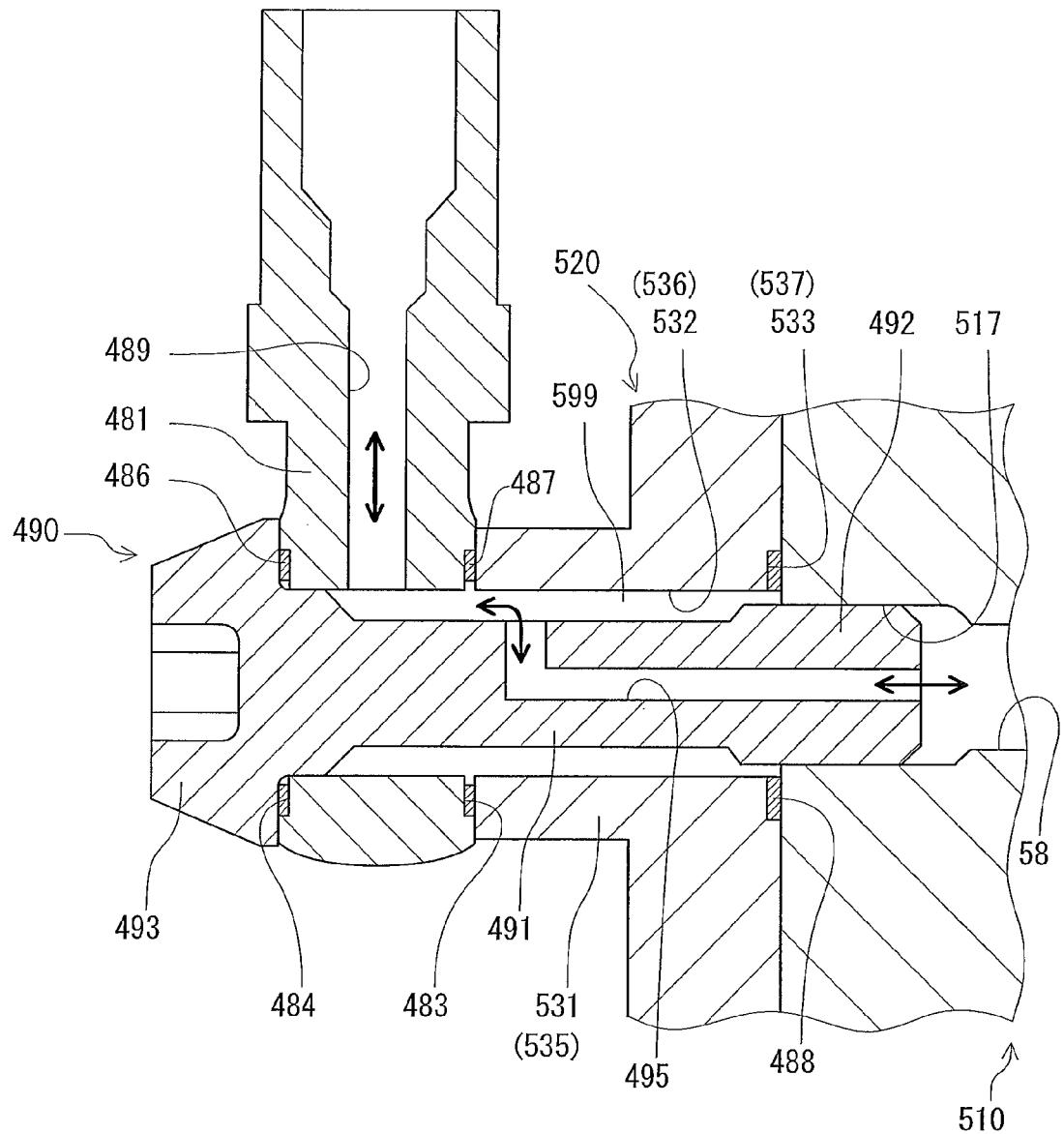
FIG. 24 is a partial cross sectional view of a first coupling member and surroundings thereof illustrated in FIG. 21.

Referring to FIG. 24, the banjo 481 includes the banjo fluid passage 489 in fluid communication with the hydraulic brake hose 86. The brake caliper 510 includes the caliper fluid passage 58 in fluid communication with the first threaded hole 517. In a state where the banjo 481 is attached to the base member 520 with the first coupling member 490, a fluid passage space 599 is defined by the first coupling member 490, the banjo 481, and the base member 520. More specifically, the fluid passage space 599 has a substantially cylindrical shape and is defined by the shaft portion 491, the banjo 481, and the first through-hole 532 (or the second through-hole 536). The fluid passage space 599 is sealed by the first seal member 487, the second seal member 486, and the third seal member 488. The fluid passage space 599 is in fluid communication with the banjo fluid passage 489. The fluid passage 495 of the first coupling member 490 is configured to connect the fluid passage space 599 to the caliper fluid passage 58. Accordingly, the banjo fluid passage 489 is in fluid communication with the caliper fluid passage 58 via the fluid passage space 599 and the fluid passage 495.

Referring to FIGS. 25A and 25B, the front fork 540 of the bicycle frame 14 includes the cavity 548 and a hose passage 549. The cavity 548 is formed between the threaded holes 43 and 44 to contain the first coupling member 490, the banjo 481, and the second coupling member 545 therein. The first coupling member 490, the banjo 481, and the second coupling member 545 are disposed in the cavity 548 in a state where the bicycle brake caliper assembly 500 is attached to the front fork 540. The hose passage 549 extends along the front fork 540 from the cavity 548 to an upper portion of the front fork 540. The hose passage 549 includes an inlet opening (not shown) at the upper portion of the front fork 540. The hydraulic brake hose 86 extends through the hose passage 549 and is configured to connect the banjo 481 to the master cylinder 24 of the brake operating mechanism 23. The hydraulic brake hose 86 extends through the inlet opening (not shown) of the hose passage 549 and is connected to the master cylinder 24 mounted on the handlebar 15 (FIG. 3).

As seen in FIGS. 25A and 25B, the bicycle brake caliper assembly 500 can be in two different states respectively corresponding to the brake disc rotor 50 and the brake disc rotor 55 which has an outer diameter greater than an outer diameter of the brake disc rotor 50, as well as the bicycle brake caliper assembly 100 of the first embodiment. More specifically, the base member 520 is configured to be coupled to the brake caliper 510 and to be attached to a bicycle frame 14 such that relative position between the rotational axis A1 of the brake disc rotors 50 and 55 and the brake caliper 510 is adjustable in the radial direction D1 of the brake disc rotors 50 and 55. The base member 520 is configured such that the first position P11 of the coupling portion 530 in a state where the base member 520 is attached to the bicycle frame 14 with the first orientation differs from the second position P12 of the coupling portion 530 in a state where the base member 520 is attached to the bicycle frame 14 with the second orientation, in the radial direction D1. In the fifth embodiment, the first and second positions P11 and P12 are defined on the basis of the center line of the second threaded hole 118, for example.

As seen in FIGS. 25A and 25B, the second distance L18 corresponding to the second orientation is greater than the first distance L17 corresponding to the first orientation. Accordingly, changing the orientation of the base member 120 relative to the front fork 540 and the brake caliper 510 allows the bicycle brake caliper assembly 500 to be adjusted to each of brake disc rotors 50 and 55 having different outer diameters R1 and R2. Since the first coupling member 490 has a function as both the fluid communicating member 490 and the first coupling member 141, the number of the components or parts can be reduced, which allows the cost reduction of the bicycle disc brake device.

Furthermore, since the banjo 481 and the first coupling member 490 are disposed in the cavity 548 of the front fork 540, the banjo 481, the first coupling member 490, and the hydraulic brake hose 86 can be protected by the front fork 440.

Sixth Embodiment

A bicycle brake caliper assembly 600 in accordance with a sixth embodiment of the present invention will be described below referring to FIG. 26. Elements having substantially the same function as those in the first to fifth embodiments will be numbered the same here, and will not be described again in detail.

In the above embodiments, the base member is a separate member from the brake caliper; however, the brake caliper and the base member can be formed as a one piece unitary member. As discussed below, the brake caliper 110 and the base member 220 of the second embodiment can be formed as a one piece unitary member, for example.

Figure 26:
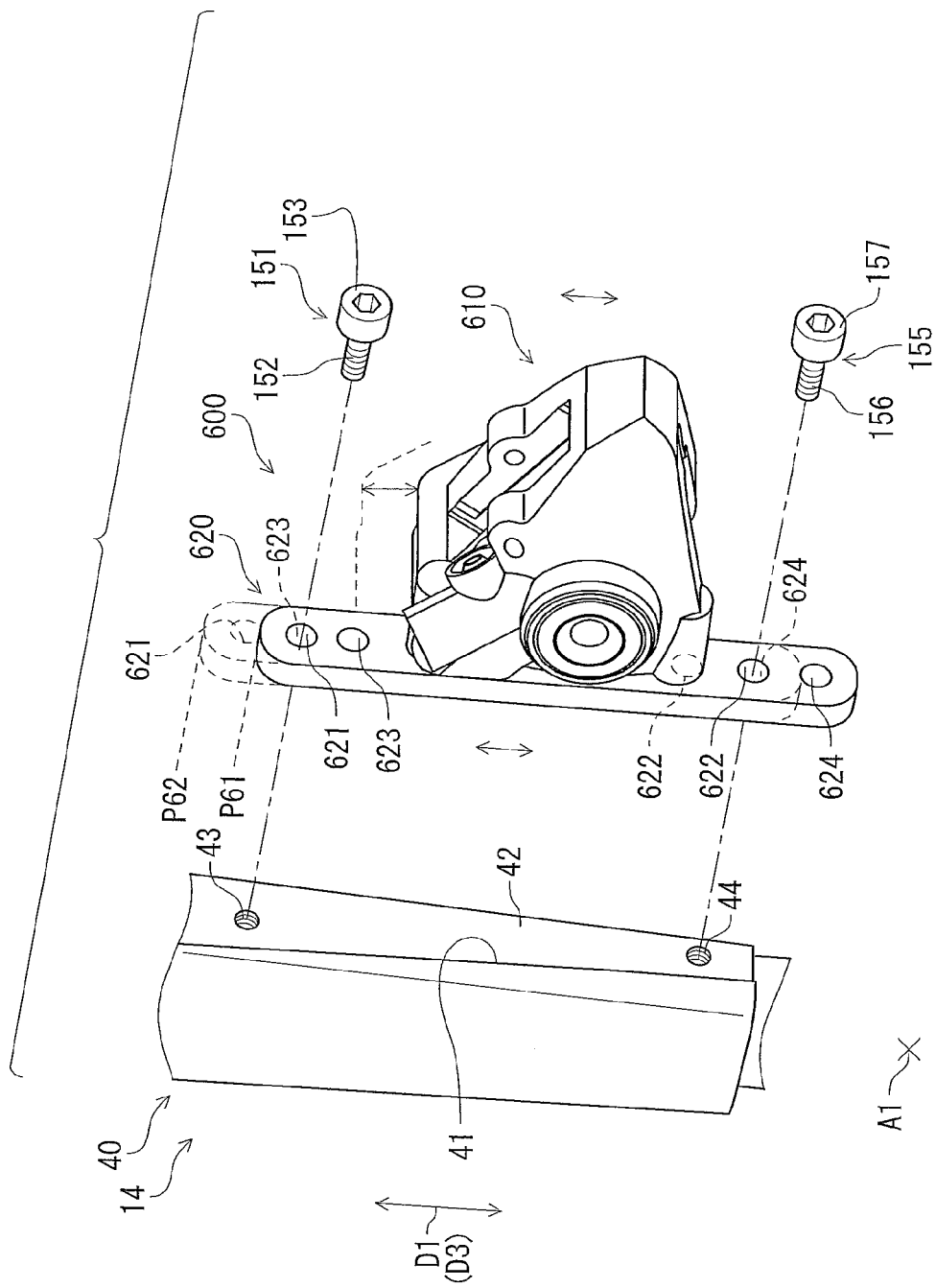
FIG. 26 is an exploded perspective view of the bicycle brake caliper assembly in accordance with a sixth embodiment of the present invention.

Referring to FIG. 26, the bicycle brake caliper assembly 600 comprises a brake caliper 610 and a base member 620. In this sixth embodiment, the brake caliper 610 and the base member 620 are formed as a one piece unitary member. The bicycle brake caliper assembly 600 is made of metallic material such as aluminum alloy or iron. The brake caliper 610 is configured to apply a braking force on a brake disc rotor configured to be rotatable about a rotational axis A1. The base member 620 is configured to be coupled to the brake caliper 610 and to be attached to the bicycle frame 14 (the front fork 40) such that relative position between the rotational axis A1 of the brake disc rotor and the brake caliper 710 is adjustable in the radial direction D1 of the brake disc rotor.

More specifically, the base member 620 includes a first attaching through-hole 621, a second attaching through-hole 622, a third attaching through-hole 623, and a fourth attaching through-hole 624. A first attaching member 151 passes through one of the first attaching through-hole 621 and the third attaching through-hole 623. A second attaching member 155 passes through one of the second attaching through-hole 622 and the fourth attaching through-hole 624.

The first attaching member 151 and the second attaching member 155 passes through the first attaching through-hole 621 and the second attaching through-hole 622 to attach the base member 620 to the front fork 40 of the bicycle frame 14 at a first position P61. The first attaching member 151 and the second attaching member 155 passes through the third attaching through-hole 623 and the fourth attaching through-hole 624 to attach the base member 620 to the front fork 40 at a second position P62 which is different from the first position P61 in the radial direction D1. The second position P62 is farther from the rotational axis than the first position P61.

Since the brake caliper 610 and the base member 620 are formed as a one piece unitary member, the first coupling member 141 and the second coupling member 145 described in the above embodiments can be omitted, which allows the cost reduction of the bicycle brake caliper assembly.

Seventh Embodiment

A bicycle brake caliper assembly 700 in accordance with a seventh embodiment of the present invention will be described below referring to FIG. 27. Elements having substantially the same function as those in the first to fifth embodiments will be numbered the same here, and will not be described again in detail.

In the above embodiments, the base member is a separate member from the brake caliper; however, the brake caliper and the base member can be formed as a one piece unitary member. As discussed below, the brake caliper 110 and the base member 320 of the third embodiment can be formed as a one piece unitary member, for example.

Figure 27:
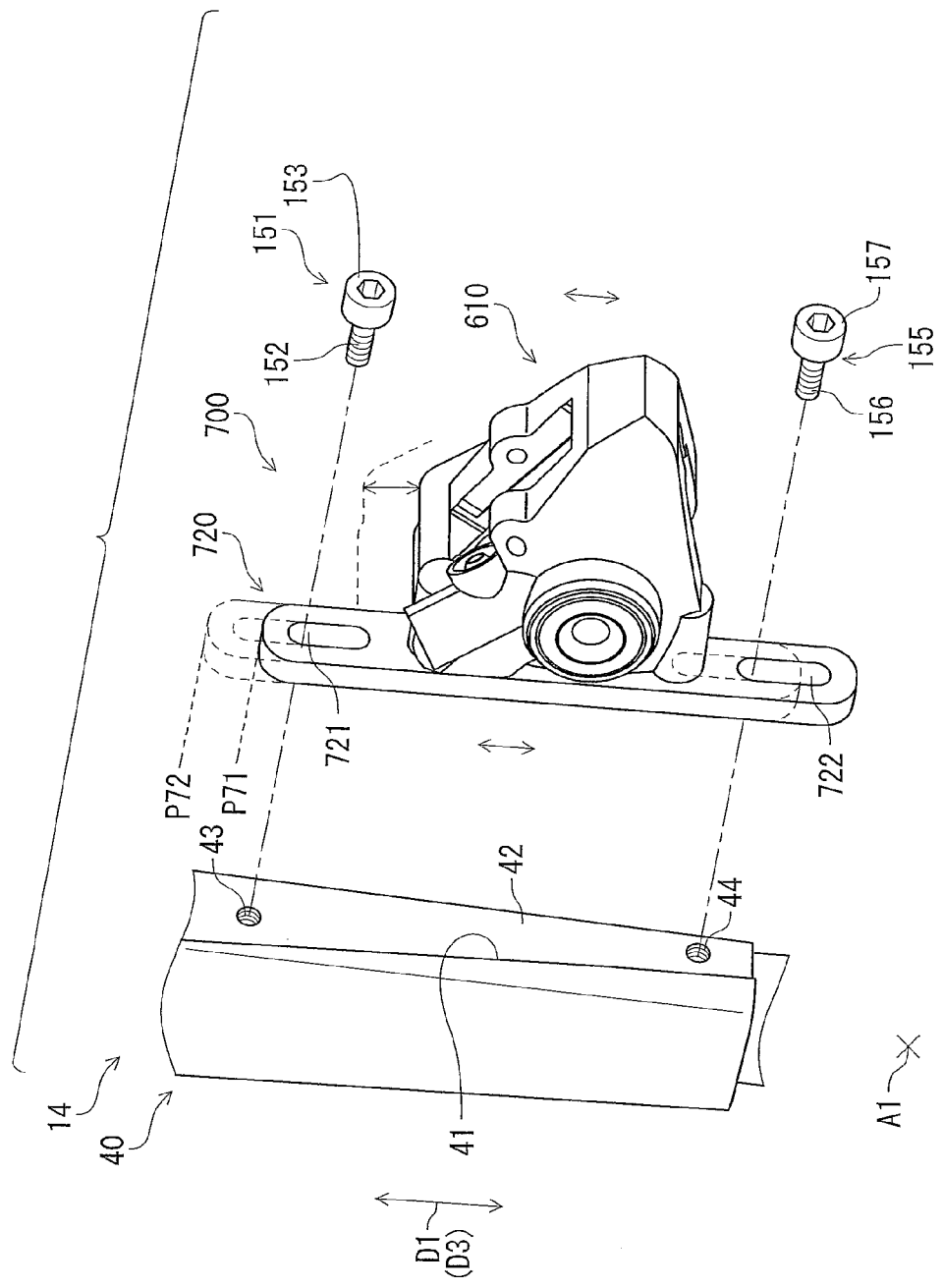
FIG. 27 is an exploded perspective view of the bicycle brake caliper assembly in accordance with a seventh embodiment of the present invention.

Referring to FIG. 27, the bicycle brake caliper assembly 700 comprises a brake caliper 710 and a base member 720. In this seventh embodiment, the brake caliper 710 and the base member 720 are formed as a one piece unitary member as well as the sixth embodiment. The bicycle brake caliper assembly 700 is made of metallic material such as aluminum alloy or iron. The brake caliper 710 is configured to apply a braking force on a brake disc rotor configured to be rotatable about a rotational axis A1. The base member 720 is configured to be coupled to the brake caliper 710 and to be attached to a bicycle frame such that relative position between the rotational axis A1 of the brake disc rotor and the brake caliper 710 is adjustable in the radial direction D1 of the brake disc rotor.

More specifically, the base member 720 includes a first attaching through-hole 721 and a second attaching through-hole 722. The first attaching through-hole 721 extends in the radial direction D1 (in the longitudinal direction D3 of the base member 720). The second attaching through-hole 722 extends in the radial direction D1 (in the longitudinal direction D3 of the base member 720). The first attaching member 151 passes through the first attaching through-hole 721 to attach the base member 720 to the front fork 40 of the bicycle frame 14. The second attaching member 155 passes through the second attaching through-hole 722 to attach the base member 720 to the front fork 40 of the bicycle frame 14.

Since the first attaching through-hole 721 and the second attaching through-hole 722 extend in the radial direction D1, the relative position between the rotational axis A1 of the brake disc rotor and the brake caliper 710 is adjustable in the radial direction D1 of the brake disc rotor within the range of the first attaching through-hole 721 or the second attaching through-hole 722. In this embodiment, the relative position between the rotational axis A1 of the brake disc rotor and the brake caliper 710 is adjustable in the radial direction D1 of the brake disc rotor between a first position P71 and a second position P72.

Since the brake caliper 710 and the base member 720 are formed as a one peace unitary member, the first coupling member 141 and the second coupling member 145 described in the above embodiments can be omitted, which allows the cost reduction of the bicycle brake caliper assembly.

In understanding the scope of the present invention, as used herein to describe the above embodiment(s), the following directional terms "front", "rear", "forward", "rearward", "left", "right", "upward" and "downward" as well as any other similar directional terms refer to those directions which are determined on the basis of the rider who sits on a saddle of a bicycle with facing a handlebar of the bicycle. Accordingly, these terms, as utilized to describe the bicycle brake caliper assembly should be interpreted relative to a bicycle equipped with the bicycle brake caliper assembly as used in an upright riding position on a horizontal surface.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This definition also applies to words of similar meaning, for example, the terms "have", "include" and their derivatives.

The terms "member", "section," "portion," "part" or "element" when used in the singular can have the dual meaning of a single part or a plurality of parts.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle brake caliper assembly comprising:
a brake caliper configured to apply a braking force on a brake disc rotor configured to be rotatable about a rotational axis; and
a base member configured to be coupled to the brake caliper and to be attached to a bicycle frame such that relative position between the rotational axis of the brake disc rotor and the brake caliper is adjustable in a radial direction of the brake disc rotor, wherein
the base member includes a coupling portion at which the brake caliper is coupled,
the base member is attached to the bicycle frame with one of a first orientation and a second orientation, and
the base member is configured such that a first position of the coupling portion in a state where the base member is attached to the bicycle frame with the first orientation differs from a second position of the coupling portion in a state where the base member is attached to the bicycle frame with the second orientation, in the radial direction.

2. The bicycle brake caliper assembly according to claim 1, further comprising:
a first coupling member configured to couple the brake caliper to the base member, wherein
the coupling portion includes a first through-hole through which the first coupling member passes.

3. The bicycle brake caliper assembly according to claim 2, wherein
the brake caliper includes a caliper fluid passage, and
the first coupling member provides a fluid passage configured to communicate with the caliper fluid passage.

4. The bicycle brake caliper assembly according to claim 2, further comprising:
a second coupling member configured to couple the brake caliper to the base member, wherein
the coupling portion includes a second through-hole through which the second coupling member passes and which is arranged apart from the first through-hole in the radial direction.

5. The bicycle brake caliper assembly according to claim 4, wherein
the brake caliper includes a caliper fluid passage,
the base member includes an additional through-hole thorough which a fluid communicating member fluidly communicating with the caliper fluid passage passes, and
the additional through-hole is arranged at a middle position between the first through-hole and the second through-hole.

6. The bicycle brake caliper assembly according to claim 4, wherein the base member comprises
a first attaching through-hole through which a first attaching member passes to attach the base member to the bicycle frame, and
a second attaching through-hole through which a second attaching member passes to attach the base member to the bicycle frame, and
wherein the second attaching through-hole is spaced apart from the first attaching through-hole in the radial direction and the first through-hole and the second through-hole are arranged between the first attaching through-hole and the second attaching through-hole.

7. The bicycle brake caliper assembly according to claim 6, wherein
a distance between a center of the first attaching through-hole and a center of the first through-hole is greater than a distance between a center of the second attaching through-hole and a center of the second through-hole.

8. The bicycle brake caliper assembly according to claim 7, wherein
the brake caliper includes a first threaded hole and a second threaded hole,
the first coupling member includes a first external thread,
the second coupling member includes a second external thread,
the first external thread is screwed in the first threaded hole through the second through-hole and the second external thread is screwed in the second threaded hole through the first through-hole in a state where the base member is attached to the bicycle frame with the first orientation, and
the first external thread is screwed in the first threaded hole through the second through-hole and the second external thread is screwed in the second threaded hole through the first through-hole in a state where the base member is attached to the bicycle frame with the second orientation.

9. The bicycle brake caliper assembly according to claim 6, wherein
the first attaching through-hole and the second attaching through-hole extend in an axial direction of the brake disc rotor in a state where the base member is attached to the bicycle frame.

* * * * *